United States Patent
Larsson

(10) Patent No.: US 11,794,776 B2
(45) Date of Patent: Oct. 24, 2023

(54) TRAJECTORY VALIDATION FOR AUTONOMOUS DRIVING

(71) Applicant: Aptiv Technologies Limited, St. Michael (BB)

(72) Inventor: Oskar Larsson, Gothenburg (SE)

(73) Assignee: Aptiv Technologies Limited, St. Michael (BB)

( * ) Notice: Subject to any disclaimer, the term of this patent is extended or adjusted under 35 U.S.C. 154(b) by 213 days.

(21) Appl. No.: 17/522,256

(22) Filed: Nov. 9, 2021

(65) Prior Publication Data
US 2022/0250644 A1 Aug. 11, 2022

(30) Foreign Application Priority Data
Feb. 9, 2021 (EP) ..................... 21155970

(51) Int. Cl.
*B60W 60/00* (2020.01)

(52) U.S. Cl.
CPC ..... *B60W 60/001* (2020.02); *B60W 2520/105* (2013.01); *B60W 2520/125* (2013.01); *B60W 2552/05* (2020.02); *B60W 2552/10* (2020.02); *B60W 2554/4041* (2020.02); *B60W 2554/4042* (2020.02); *B60W 2554/4043* (2020.02)

(58) Field of Classification Search
CPC ......... B60W 60/001; B60W 2520/125; B60W 2552/05; B60W 2552/10
See application file for complete search history.

(56) References Cited

U.S. PATENT DOCUMENTS

| 2016/0221575 A1* | 8/2016 | Posch | B60W 50/10 |
| 2016/0313133 A1* | 10/2016 | Zeng | B60W 60/0011 |
| 2018/0074507 A1* | 3/2018 | Gao | B60W 30/09 |

(Continued)

FOREIGN PATENT DOCUMENTS

| DE | 102019208525 | 12/2020 |
| EP | 2853457 | 4/2015 |
| WO | 2020035728 | 2/2020 |

OTHER PUBLICATIONS

"Extended European Search Report", EP Application No. 21156010.7, dated Aug. 27, 2021, 6 pages.

(Continued)

*Primary Examiner* — Navid Z. Mehdizadeh
*Assistant Examiner* — Kenneth M Dunne
(74) *Attorney, Agent, or Firm* — Sawtooth Patent Group PLLC

(57) ABSTRACT

A method of determining whether a planned trajectory of a first vehicle over a road along which the first vehicle and a second vehicle are traveling, is invalid, comprising: obtaining the planned trajectory, comprising a first state of the first vehicle for each of a plurality of time instants; obtaining a second state of the second vehicle for each time instant; determining, for each time instant, a respective lateral range extending from the second vehicle; and determining that the planned trajectory is invalid where, for the first and second states at one or more of the time instants: the first vehicle is within the lateral range and within a lane boundary region of the road; and a direction of a lateral velocity of the first vehicle is towards the second vehicle and a lateral acceleration of the first vehicle away from the second vehicle is smaller than a predetermined threshold.

20 Claims, 14 Drawing Sheets

(56) References Cited

U.S. PATENT DOCUMENTS

| | | |
|---|---|---|
| 2019/0291726 A1 | 9/2019 | Shalev-Shwartz et al. |
| 2020/0148260 A1 | 5/2020 | Wu et al. |
| 2020/0156631 A1 | 5/2020 | Lin et al. |
| 2021/0024065 A1 | 1/2021 | Mizoguchi |

OTHER PUBLICATIONS

"Extended European Search Report", EP Application No. 21155970. 3, dated Aug. 27, 2021, 8 pages.
Diehl, et al., "Radar-based Dynamic Occupancy Grid Mapping and Object Detection", Aug. 9, 2020, 6 pages.
Hoermann, et al., "Dynamic Occupancy Grid Prediction for Urban Autonomous Driving: A Deep Learning Approach with Fully Automatic Labeling", Nov. 7, 2017, 8 pages.
Larsson, "The Oskillator Artificial Force Field Highway Chauffeur", Jan. 2017, 85 pages.
Nuss, "A Random Finite Set Approach for Dynamic Occupancy Grid Maps with Real-Time Application", Sep. 10, 2016, 20 pages.
Shalev-Shwart, et al., "On a Formal Model of Safe and Scalable Self-Driving Cars", Oct. 27, 2018, 37 pages.
Steyer, "Grid-Based Environment Estimation Using Evidential Mapping and Particle Tracking", Sep. 2018, 13 pages.
Wang, "Study of Lane Change Trajectory Planning Considering of Driver Characteristics", Aug. 2018, 10 pages.
Wolf, et al., "Artificial Potential Functions for Highway Driving with Collision Avoidance", May 2008, 6 pages.

\* cited by examiner

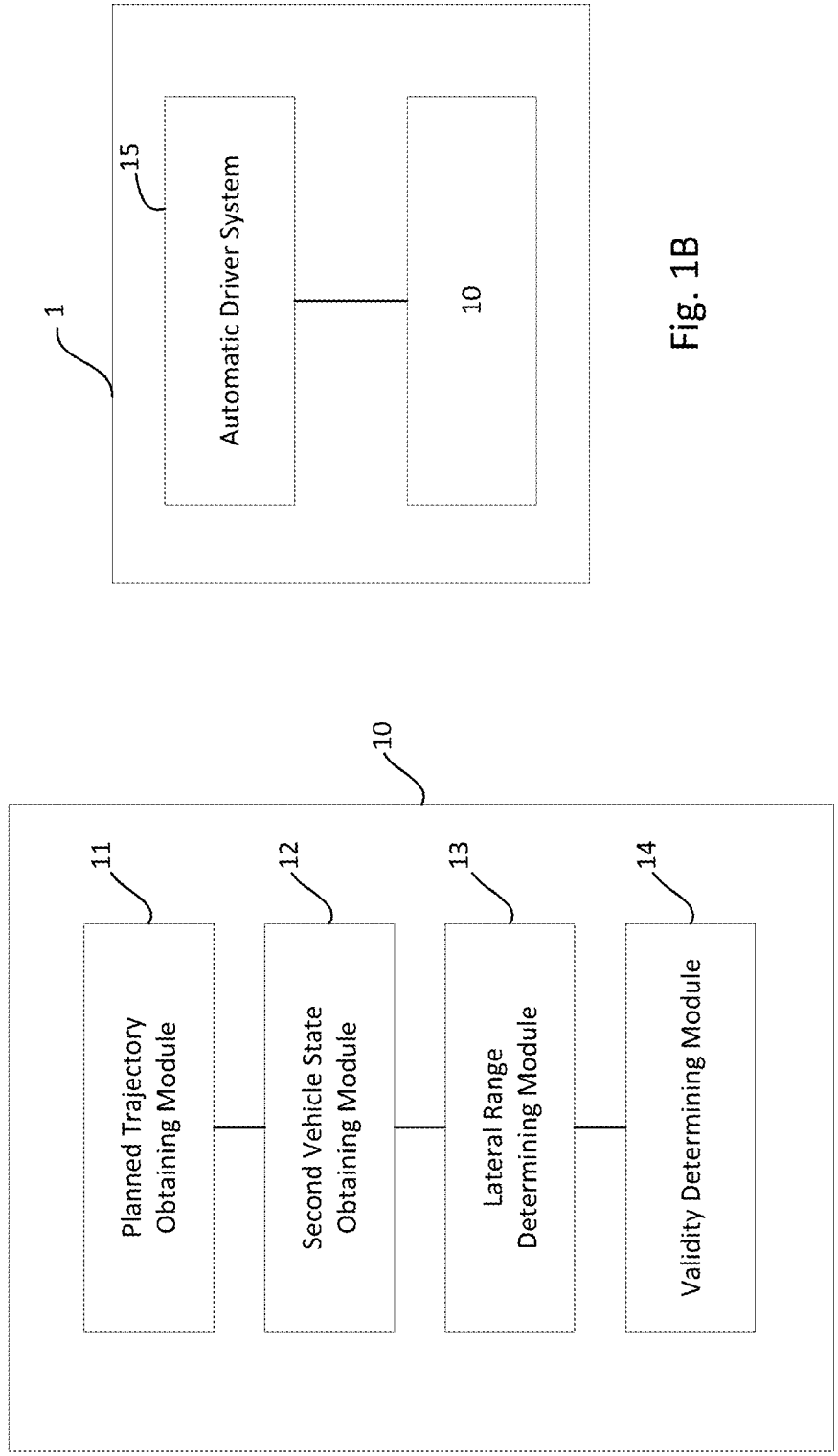

TRAJECTORY VALIDATION FOR AUTONOMOUS DRIVING

CROSS-REFERENCE TO RELATED APPLICATION

This application claims priority to European Patent Application Number 21155970.3, filed Feb. 9, 2021, the disclosure of which is hereby incorporated by reference in its entirety herein.

BACKGROUND

Autonomous driving functionality is a feature of modern vehicles which has been attracting increasing interest. Autonomous driving functionality may allow the driver of a host vehicle (i.e. the vehicle to be autonomously controlled) to hand over the control of both acceleration and steering of the vehicle to an autonomous driving system, which may be provided with a target velocity and headway time or more detailed information of an intended route. The autonomous driving system may then attempt to achieve the desired velocity through acceleration and steer the vehicle so as to follow a chosen lane.

An autonomous driving system may be further adapted to react appropriately to the actions of other road-users. For example, when the host vehicle approaches a slower-moving vehicle ahead of it, the autonomous driving system may decide whether to overtake the slower-moving vehicle or to slow down and to keep a desired headway distance to the vehicle ahead. The autonomous driving system may additionally switch lanes to follow a desired route. More advanced versions of the system may even predict the behaviour of other road-users to determine appropriate actions and reactions. Accordingly, autonomous driving systems are generally configured to obtain information from equipment such as radars, cameras, inertial measurement units etc., in order to collect data about the host vehicle and its environment and generate a high-level environment model describing the road and the traffic on it.

The autonomous driving system may then be further arranged to identify one or more manoeuvres that the host vehicle may perform based on the generated high-level environment, to select a manoeuvre to be performed, and to determined how this manoeuvre may be executed (in other words, to determine a trajectory for the host vehicle and appropriate control signals, such as for an acceleration and a steering angle of the host vehicle, that are required to achieve the determined trajectory), and to control the host vehicle to perform the determined manoeuvre. The two main approaches to autonomous driving algorithms are rule-based, and statistical models including those based on machine learning, cost functions, etc.

SUMMARY

Example aspects herein generally relate to the field of autonomous driving, in particular, to techniques for determining whether a planned trajectory for use in autonomous control of a vehicle is invalid. The present inventor has devised, in accordance with a first aspect herein, a computer-implemented method of determining whether a planned trajectory of a first model vehicle over a model of a road along which the first model vehicle and a second model vehicle are traveling, for use in autonomous control of a vehicle modeled by the first model vehicle, is invalid, the model of the road comprising a plurality of lanes defined by a plurality of lane boundaries. The method comprises obtaining the planned trajectory, the planned trajectory comprising a respective first vehicle state of the first model vehicle defined relative to the model of the road for each of a plurality of time instants, each first vehicle state being defined by a respective lateral position of the first model vehicle, a respective lateral velocity of the first model vehicle, and a respective lateral acceleration of the first model vehicle. The method further comprises obtaining a second vehicle state of the second model vehicle defined relative to the model of the road for each of the plurality of time instants, each second vehicle state being defined by a respective lateral position of the second model vehicle in the model of the road. The method further comprises determining, for each of the plurality of time instants, a respective lateral range extending from the second model vehicle, using a respective lateral position of the second model vehicle relative to a centre of a lane among the plurality of lanes in which the second model vehicle is located. The method further comprises determining that the planned trajectory is invalid in a case where, for the first vehicle state and the second vehicle state for at least one time instant of the plurality of time instants, the following conditions of a first set of conditions are satisfied: (i) the lateral position of the first model vehicle is within the lateral range of the second model vehicle at the time instant and within a lane boundary region extending along and comprising a lane boundary of the plurality of lane boundaries; and (ii) a direction of the lateral velocity of the first model vehicle is towards the second model vehicle and a magnitude of the lateral acceleration of the first model vehicle away from the second model vehicle is less than a predetermined lateral deceleration of the first model vehicle.

The present inventor has further devised, in accordance with a second aspect herein, a computer program comprising instructions, which, when executed by a computer processor, cause the computer processor to perform the method according to the first aspect. The computer program may be stored on a non-transitory computer-readable storage medium or carried by a signal.

The present inventor has further devised, in accordance with a third aspect herein, an apparatus arranged to determine whether a planned trajectory of a first model vehicle over a model of a road along which the first model vehicle and a second model vehicle are traveling, for use in autonomous control of a vehicle modeled by the first model vehicle, is invalid, the model of the road comprising a plurality of lanes defined by a plurality of lane boundaries. The apparatus comprises a planned trajectory obtaining module configured to obtain the planned trajectory, the planned trajectory comprising a respective first vehicle state of the first model vehicle defined relative to the model of the road for each of a plurality of time instants, each first vehicle state being defined by a respective lateral position of the first model vehicle, a respective lateral velocity of the first model vehicle and a respective lateral acceleration of the first model vehicle. The apparatus further comprises a second vehicle state obtaining module configured to obtain a second vehicle state of the second model vehicle defined relative to the model of the road for each of the plurality of time instants, each second vehicle state being defined by a respective lateral position of the second model vehicle in the model of the road. The apparatus further comprises a lateral range determining module configured to determine, for each of the plurality of time instants, a respective lateral range extending from the second model vehicle, using a respective lateral position of the second model vehicle relative to a centre of a lane among the plurality of lanes in which the second model vehicle is located. The apparatus further comprises a validity determining module configured to determine that the planned trajectory is invalid in a case where, for the first vehicle state and the second vehicle state for at least one time instant of the plurality of time instants, the following conditions of a first set of conditions are satisfied: (i) the lateral position of the first model vehicle is within the lateral range of the second model vehicle at the time instant and within a lane boundary region extending along and comprising a lane boundary of the plurality of lane boundaries; and (ii) a direction of the lateral velocity of the first model vehicle is towards the second model vehicle and a magnitude of the lateral acceleration of the first model vehicle away from the second model vehicle is less than a predetermined lateral deceleration of the first model vehicle.

The present inventor has further devised, in accordance with a fourth aspect herein, a vehicle comprising an automatic driver system and an apparatus according to the first aspect, which is arranged to determine whether a planned trajectory is invalid. The apparatus is further arranged to determine, in a case where the planned trajectory is not determined to be invalid, that the planned trajectory is a valid planned trajectory and to output the valid planned trajectory to the automatic driver system, the automatic driver system being arranged to autonomously control the vehicle to drive along a road in accordance with the valid planned trajectory.

BRIEF DESCRIPTION OF THE DRAWINGS

Embodiments of the disclosure will now be explained in detail, by way of non-limiting example only, with reference to the accompanying figures, described below. Like reference numerals appearing in different ones of the figures can denote identical or functionally similar elements, unless indicated otherwise.

FIG. 1A is a schematic illustration of an apparatus arranged to determine whether a planned trajectory of a first model vehicle, for use in autonomous control of a vehicle modeled by the first model vehicle, is invalid, according to an example embodiment herein.

FIG. 1B is a schematic illustration of a vehicle, according to the example embodiment herein.

DETAILED DESCRIPTION

Figure 2A:
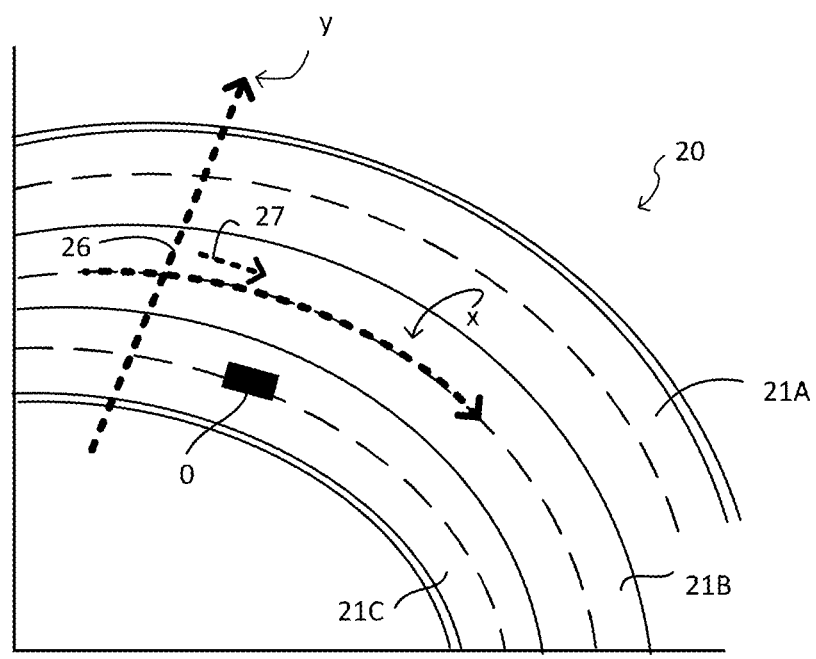
FIG. 2A illustrates an example of a model of a road defined in a lane coordinate system.

To be considered roadworthy, vehicles incorporating autonomous driving functionality are generally required to provide a high level of safety. While the safety's dependency on sensing equipment only can be proven with respect to likelihood, the algorithms used by autonomous driving systems for behavioural control and trajectory planning can be proven safe using formal models such as, Responsibility-Sensitive Safety (RSS), for example. RSS is a formal model describing allowed behaviour to guarantee safety.

However, various difficulties can arise both in implementing autonomous driving systems such that the determined behaviours and trajectories of the autonomously controlled vehicle are safe and resemble human-like behaviour (i.e. such that the autonomous control of the vehicle corresponds to the manual control performed by a safe human driver), and in formally proving the safety of autonomous driving systems, which may be overcome in order to provide roadworthy autonomous driving.

By way of example, autonomous driving algorithms based on statistical models can lack transparency compared to rule-based models. Rule-based models allow prediction of what will happen in any given situation, and a decision regarding actions that are consequently to be taken, to be linked to specific rules. In contrast, a crash caused by decision made by a statistical model (such as a machine learning model) may be harder to justify, and the causes may be more difficult or impossible to determine. The present inventor has recognised that, when generalising to an arbitrary number of vehicles in the host vehicle's environment, the behaviour in many conventional autonomous driving algorithms that are based on cost functions may have to be analysed on a case-by case basis with respect to the number of vehicles and all possible constellations of these vehicles, in order to determine safety. It is important that a trajectory generated by any of these algorithms can be validated and thus deemed safe before being used to control the host vehicle.

As such, otherwise advantageous autonomous driving algorithms based on statistical models such as machine learning or cost-functions with optimizers may be hard to analyse to such degree that mathematical guarantees of safety can be made.

Accordingly, rather than analysing an autonomous algorithm based on statistical models directly, the present inventor has recognised that simpler interpretable models of safety can be developed which can then be applied to the trajectories generated by the autonomous driving algorithm and used to validate these trajectories after they have been generated.

By way of example, a trajectory generated by an autonomous algorithm based on statistical models may be assessed using the rules of the RSS model, which define safe distances to be maintained between vehicles. However, while the RSS model may be sufficient to increase safety with respect to emergency manoeuvres, as this model may prevent vehicle collisions from a safe state, it does not define conditions for safe behaviour with respect to lanes of the road. As such, the simplest policies that comply with the rules of the RSS model may result in, for example, scenarios in which a vehicle is allowed to get stuck between other vehicles between lanes, in a case where the vehicle has avoided immediate danger but is unable to return to a safe lateral distance.

Furthermore, the distances defined by the RSS model are based on expecting emergency manoeuvres which, while safe, may not guarantee comfortable, human-like driving.

A modified Responsibility-Sensitive Safety (MRSS) model is proposed in the Master's Thesis of Oskar Larsson titled "The Oskillator, Artificial Force Field Highway Chauffeur" Chalmers University of Technology, Gothenburg, Sweden 2019 (https://hdl.handle.net/20.500.12380/300733), the contents of which are incorporated herein in their entirety. In the MRSS model, a safe lateral distance is defined as a minimum lateral evasive distance, but not only to the other vehicles themselves, but to all lanes within a minimum lateral evasive distance of the other vehicle. This approach allows it to be ensured that collisions between vehicles are avoided and to avoid vehicles turning into a same lane and thus possible unsafe scenarios arising. As such, this approach takes into consideration the required behaviour of a host vehicle with respect to lanes of road.

However, the present inventor has recognised that neither of these safety models take into consideration how a host vehicle may better respond when other road-users engage in unsafe driving that breaks the rules defined by these safety models.

By way of example, unsafe driving may include, for example, cases where another road-user trailing a host vehicle is dangerously close to the host vehicle, i.e. trails the host vehicle by a distance that is less than an emergency distance which the trailing road user may require to perform an emergency braking manoeuvre. Another example of unsafe driving may occur where another road-user moves into a lane in which the host vehicle is driving at a dangerously close distance behind or in front of the host vehicle.

In such cases, a human driver may, for example, control their vehicle to stay in the same lane or to switch into another lane. Such manoeuvres may be considered by a safe human driver to represent a best response to a dangerous scenario caused by the other road-user. However, for both of these manoeuvres, application of the rules of the RSS model or the MRSS model will result in corresponding trajectories generated by an autonomous driving algorithm being invalidated as the host vehicle may, according to the rules of these models, be dangerously close to the other road-user initially.

As such, the present inventor has recognised that the application of the rules of existing safety models may result in trajectories generated by an autonomous driving algorithm being invalidated as dangerous, even where such trajectories represent a best response (i.e. any safety issues are unavoidable and do not immediately endanger the driver or other road-users) to a dangerous situation caused by the unsafe driving of another road-user.

Furthermore, the present inventor has recognised that some existing safety models, such as the MRSS model, do not discuss how to validate an actual trajectory generated by an autonomous driving algorithm using the defined rules.

Example embodiments described in the following may address one or more of the issues outlined above and will now be described in detail with reference to the accompanying drawings. Where technical features in the drawings, detailed description or any claim are followed by reference signs, the reference signs have been included for the sole purpose of increasing the intelligibility of the drawings, detailed description, and claims. Accordingly, neither the reference signs nor their absence should be interpreted to have any limiting effect on the scope of any claim elements.

FIG. 1A is a schematic illustration of an apparatus 10 arranged to determine whether a planned trajectory of a first model vehicle, for use in autonomous control of a vehicle 1 modeled by the first model vehicle, is invalid, according to an example embodiment herein.

More particularly, the apparatus 10 is arranged to determine whether a planned trajectory of the first model vehicle over a model of a road 20 (shown in FIG. 2A) along which the first model vehicle and a second model vehicle O (shown in FIG. 2A) are traveling, for use in autonomous control of a vehicle 1 modeled by the first model vehicle, is invalid. The model of the road 20 includes a plurality of lanes 21A, 21B, 21C defined by a plurality of lane boundaries. By way of example, the vehicle 1 may, as in the present example embodiment, be considered as a host vehicle (i.e. a vehicle to be autonomously controlled).

FIG. 2A illustrates an example of a model of a road 20 defined in a lane coordinate system. The model of the road 20 is an example of a modeled road along which the first model vehicle and the second model vehicle O may travel.

Figure 2B:
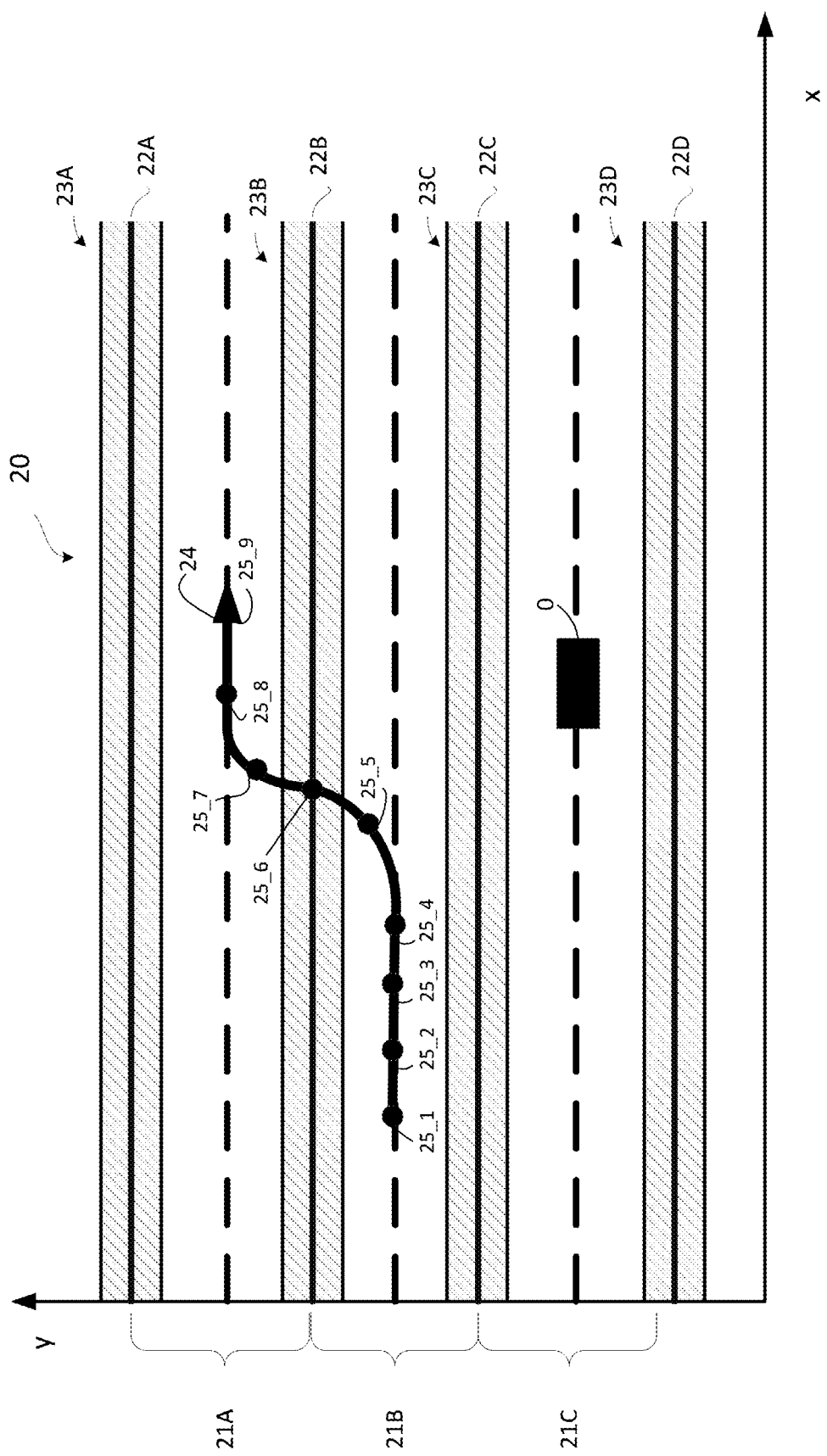
FIG. 2B illustrates an example of a planned trajectory of the first model vehicle over the model of a road of FIG. 2A.

In the example of FIG. 2A, the road 20 has three lanes 21A, 21B and 21C defined by a plurality of lane boundaries 22A, 22B, 22C, 22D (shown in FIG. 2B). The lanes of the road 20 may, as in the present example, have the same width. One of the lanes 21A, 21B, 21C may, as in the present example, serve as a so-called "fast lane" and another of the lanes 21A, 21B, 21C may serve as a so-called "slow lane". In the present example, the leftmost lane 21A serves as the fast lane and the rightmost lane 21C serves as the slow lane.

The exemplary model of the road 20 shown in FIG. 2A illustrates the road 20 and the traffic thereon at a particular instant in time. In the exemplary model of the road 20, the first model vehicle is located at a position 26 in the middle lane 21B and traveling in the direction indicated by arrow 27. The second model vehicle O (e.g. a vehicle of another road-user, that is a road-user other than the first model vehicle) is traveling in the right-most lane 21C in the same direction as the first model vehicle.

The position of the first model vehicle and of the second model vehicle O in the model of the road 20 may, as in the present example, be defined with respect to a centre of a bounding box of each vehicle. By way of alternative, the position of the first model vehicle and the second model vehicle O may be defined by in relation to any other predefined reference point on the model vehicle such as, for example, a predetermined corner of the bounding box of the model vehicle, a centre of mass of the model vehicle, a centroid of the model vehicle, etc.

Although the model of the road 20 shown in FIG. 2A has three lanes, the road on which the model of the road 20 is based may have one lane, two lanes or four or more lanes and a corresponding number of lanes may be included in the model of the road 20. By way of further alternative, while a single second model vehicle O is shown in the model of the road 20 illustrated in FIG. 2A, any suitable number of model vehicles other than the first model vehicle may be included in a model of a road 20 and, optionally, the number of additional model vehicles may depend on the traffic on the road at a given time. By way of example, the number of additional model vehicles may be determined from information from equipment such as radars, cameras, inertial measurement units etc. that collect data about the vehicle 1 and its environment in order to generate a high-level environment model describing the road and the traffic on it, i.e. the model of the road 20.

In the example of FIG. 2A, the model of the road 20 is defined in a lane coordinate system. The lane coordinate system may be a two-dimensional curvilinear coordinate system adapted to reflect the road on which the model of the road 20 is to be based. In particular, a curvilinear coordinate system constituting the lane coordinate system has two axes, namely a longitudinal axis or x-axis (indicated by reference sign x in FIG. 2A) which extends in a longitudinal direction along the road and a lateral axis or y-axis (indicated by reference sign y in FIG. 2A) which extends across the road. The x-axis is always parallel to the lanes of the road and the y-axis is orthogonal to the x-axis at every value of x. By way of alternative, the lane coordinate system and thus the model of the road 20 may be defined by any other suitable means, such as by using a Cartesian coordinate system or any other suitable coordinate system.

More generally, the lane coordinate system and the model of the road 20 may be defined in any suitable way such that the apparatus 10 is provided with information on the position of the first model vehicle, the number and width of lanes 21A, 21B, 21C, the position and velocity of the second model vehicle O and any additional model vehicles on the road, and optionally also the curvature of the road 20.

In the example lane coordinate system shown in FIG. 2A, the x-axis of the lane coordinate system is increasing in the direction of forward travel of the first model vehicle and the y-axis of the lane coordinate system is increasing in the direction of the leftmost lane 21A of the model of the road 20. However, the lane coordinate system may be orientated in any other suitable way. By way of example, the x-axis of the lane coordinate system may be increasing in a direction opposite to the direction of forward travel of the first model vehicle and/or the y-axis may be increasing in a direction of the rightmost lane of the model of road 20.

Furthermore, the lane coordinate system may, as in the example of FIG. 2A, be defined such that x=0 denotes the position of the first model vehicle in the x-axis and y=0 denotes the centre of a lane of the road 20. In particular, the lane coordinate system may, as in the example of FIG. 2A, be defined such that y=0 denotes the centre of the centre lane 21B. However, the lane coordinate system may be defined in any other suitable manner, e.g. y=0 may be selected denote the centre of any lane among the plurality of lanes of the model of road 20.

As shown in FIG. 1A, the apparatus 10 includes a planned trajectory obtaining module 11, a second vehicle state obtaining module 12, a lateral range determining module 13, and a validity determining module 14.

The planned trajectory obtaining module 11 is configured to obtain a planned trajectory, the planned trajectory comprising a respective first vehicle state of the first model vehicle defined relative to the model of the road for each of a plurality of time instants, each first vehicle state being defined by a respective lateral position of the first model vehicle, a respective lateral velocity of the first model vehicle and a respective lateral acceleration of the first model vehicle.

In particular, it is assumed that sufficient information and data about the vehicle 1 and its environment may be obtained from equipment such as radars, cameras, inertial measurement units etc., so that the model of the road 20 generated therefrom may describe the estimated future state of the environment of the vehicle (e.g. the road and the traffic thereon). That is, while the example of the model of the road 20 shown in FIG. 2A illustrates the road and the traffic thereon, i.e. the estimated state of the environment, at a particular instant in time, the model of the road 20 may, as in the present example embodiment, further describe the estimated state of the environment for a plurality of future time instants. For example, the model of the road 20 may describe the estimated state of the environment at different time instants during a set period of time in the future starting from, for example, a present time instant or a next future time instant.

By way of more specific example, the set period may be between 0.1 and 5 seconds, and the model of the road 20 may include an estimated state of the environment for each of a plurality of time instants in that set period. The plurality of time instants may correspond to a plurality of time steps with a set time interval between each pair of successive time instants. For example, the model of the road 20 may include a plurality of estimated states of the environment at 0.25-second intervals over a period of 5 seconds. The intervals may be short enough for the use of linear interpolation or an assumption of constant velocity or acceleration to yield a sufficiently accurate representation of the vehicle state at that time.

FIG. 2B illustrates an example of a planned trajectory 24 of the first model vehicle over the model of a road 20 of FIG. 2A. In particular, FIG. 2B illustrates a section of the model of the road 20 over which the road is approximately linear.

In the model of the road 20, the y-axis may, as in the present example shown in FIG. 2B, be scaled to the lane width such that each increment or decrement of 1 in the y-axis represents the width of one lane, such that y=1 denotes the centre of the leftmost lane 21A and y=−1 denotes the centre of the rightmost lane 21C and y={−1.5, −0.5, 0.5, 1.5} denote the lane boundaries 22A, 22B, 22C, 22D of lanes 21A, 21B and 21C. Alternatively, the y-axis may be scaled in any other suitable manner, e.g. such that each increment or decrement of 1 in the y-axis represents half the width of one lane so that both the lane centres and so lane boundaries have integer values or the y-axis may not be scaled.

Additionally, or alternatively, the model of the road 20 may, as in the present example shown in FIG. 2B, include a plurality of lane boundary regions 23A, 23B, 23C, 23D. Each lane boundary region 23A, 23B, 23C, 23D extends along and comprising a respective lane boundary 22A, 22B, 22C, 22D of the plurality of lane boundaries.

Each lane boundary region may, as in the present example, be defined using a lateral offset $\Delta y_{bias}$ from the centre of the corresponding lane. The value of the lateral offset $\Delta y_{bias}$ may be selected so as to represent an acceptable deviation from the lane centre (bias leeway) that a vehicle may have while still being considered to remain fully (safely) within the lane. In particular, in order to ensure safety, the first model vehicle may stay near the centre of a lane in which is traveling unless the first model vehicle is switching lanes and the lateral offset $\Delta y_{bias}$ may be selected so as to represent the maximal lateral deviation from a centre of the lane the first model vehicle may appropriately have when not switching lanes. Accordingly, the lane boundary region may correspond to the part of each lane 21A, 21B, 21C, on either side of a lane boundary 22A, 22B, 22C, 22D which is more than the lateral offset $\Delta y_{bias}$ from the centre of that lane 21A, 21B, 21C.

By way of more specific example, the lane boundary regions $R_l$ may, as in the present example, be formally defined as follows:

$$R_l = \{(x,y) \in R^2 \ s.t. \ \tilde{y} < -\Delta y_{bias} \text{ or } \Delta y_{bias} < \tilde{y}\}, \quad (1)$$

where $\tilde{y} \in [-0.5, 0.5)$ and $\tilde{y} = ((y+0.5) \bmod 1) - 0.5$

The planned trajectory 24 includes a respective first vehicle state of the first model vehicle defined relative to the model of the road 20 for each of a plurality of time instants. By way of example, in the example shown in FIG. 2B, the planned trajectory includes nine first vehicle states defined by a respective lateral position 25_1 to 25_9 of the first model vehicle. Although not shown in FIG. 2B, each of the first vehicle states is further defined by a respective lateral velocity of the first model vehicle and a respective lateral acceleration of the first model vehicle.

As such, in the example shown in FIG. 2B, the planned trajectory 24 defines a manoeuvre by which the first model vehicle moves from lane 21B into lane 21A in nine steps by defining the state of the first model vehicle in terms of lateral positions, lateral velocity and lateral acceleration (that is, the first vehicle state) at each of nine successive time instants while executing this manoeuvre. In the present example, the plurality of time instants includes nine time instants. However, as discussed above, any suitable number of time instants may be considered.

Optionally, the respective first vehicle state of each of the plurality of time instants may further include any additional information defining the state of the first model vehicle. By way of non-limiting example, the first vehicle state may additionally include one or more of a longitudinal position of the first model vehicle, a longitudinal velocity of the first model vehicle, a longitudinal acceleration of the first model vehicle, a lateral extent or width of the first model vehicle and a longitudinal extent or length of the first model vehicle.

By way of example, the first vehicle state for each of the plurality of time points may, as in the present example embodiment, be defined by the following information of the first model vehicle:

l—longitudinal extent (length)
w—lateral extent (width)
y—lateral position
$v_x$—longitudinal velocity
$v_y$—lateral velocity
$a_x$—longitudinal acceleration
$a_y$—lateral acceleration More generally, the first model vehicle and any additional model vehicles may, as in the present example, be represented as an object having dynamic properties as described above defined in the lane coordinate system. As will be discussed in more detail below, the first model vehicle and any additional model vehicles may alternatively be represented as one or more cells of a grid having dynamic properties defined in the lane coordinate system.

Referring again to FIG. 1A, the second vehicle state obtaining module 12 is configured to obtain a second vehicle state of the second model vehicle O defined relative to the model of the road 20 for each of the plurality of time instants, each second vehicle state being defined by a respective lateral position of the second model vehicle O in the model of the road 20.

By way of example, similar to the first vehicle state, the second vehicle state for each of the plurality of time instants may, as in the present example, be represented as an object having dynamic properties defined in the lane coordinate system. As will be discussed in more detail below, the first model vehicle and any additional model vehicles may alternatively be represented as one or more cells of a grid having dynamic properties defined in the lane coordinate system.

By way of more specific example, the second model vehicle O may, as in the present example embodiment, be defined by a coordinate identifying a location of the second model vehicle O in a lane coordinate system of the model of the road 20, a length of the second model vehicle along a longitudinal axis of the lane coordinate system, and a width of the second model vehicle along a lateral axis of the lane coordinate system. By way of alternative, the second model vehicle O may be defined by one or more cells of a grid defined in the lane coordinate system, as will be discussed in more detail below.

By way of further example, the respective second vehicle state of each of the plurality of time instants may optionally further include any additional information defining the state of the second model vehicle O. By way of non-limiting example, the second vehicle state may additionally include one or more of a longitudinal position of the second model vehicle O, a longitudinal velocity of the second model vehicle O, a lateral velocity of the second model vehicle O, a longitudinal acceleration of the second model vehicle O, a lateral acceleration of the second model vehicle O, a longitudinal extent or length of the first model vehicle, and a lateral extent or width of the second model vehicle O.

By way of example, the second vehicle state for each of the plurality of time points may, as in the present example embodiment, be defined by the following information of the second model vehicle O (where the subscript i denotes that the second model vehicle O may be the $i^{th}$ model vehicle among one or more model vehicles defined in the model of the road 20 in addition to the first model vehicle):

$l_i$—longitudinal extent (length)
$w_i$—lateral extent (width)
$x_i$—longitudinal position
$y_i$—lateral position
$v_{x,i}$—longitudinal velocity
$v_{y,i}$—lateral velocity
$a_{x,i}$—longitudinal acceleration
$a_{y,i}$—lateral acceleration The lateral range determining module 13 is configured to determine, for each of the plurality of time instants, a respective lateral range extending from the second model vehicle O, using a respective lateral position of the second model vehicle O relative to a centre of a lane 21C among the plurality of lanes in which the second model vehicle O is located.

The validity determining module 14 is configured to determine that the planned trajectory is invalid in a case where, for the first vehicle state and the second vehicle state for at least one time instant of the plurality of time instants, the following conditions of a first set of conditions are satisfied:

(i). the lateral position of the first model vehicle is within the lateral range of the second model vehicle O at the time instant and within a lane boundary region 23A, 23B, 23C, 23D extending along and comprising a lane boundary 22A, 22B, 22C, 22D of the plurality of lane boundaries; and (ii). a direction of the lateral velocity of the first model vehicle is towards the second model vehicle O and a magnitude of the lateral acceleration of the first model vehicle away from the second model vehicle O is less than a predetermined lateral deceleration of the first model vehicle.

FIG. 1B is a schematic illustration of a vehicle 1, according to an example embodiment herein. The vehicle 1 may, as in the present example embodiment, be considered as a host vehicle (i.e. a vehicle to be autonomously controlled) and serves as an example of a vehicle that may be modeled by the first model vehicle.

The vehicle 1 includes an automatic driver system 15 and the apparatus 10, which is arranged to determine whether a planned trajectory is invalid. In the example embodiment of FIG. 1B, the apparatus is further arranged to determine, in a case where the planned trajectory is not determined to be invalid, that the planned trajectory is a valid planned trajectory and to output the valid planned trajectory to the automatic driver system 15.

The automatic driver system 15 is arranged to autonomously control the vehicle 1 to drive along a road in accordance with the valid planned trajectory. By way of example, the automatic driver system 15 may be arranged to generate control signals for controlling steering and/or acceleration of the vehicle 1 to cause vehicle 1 to perform a manoeuvre in accordance with the valid planned trajectory or the control the vehicle 1 by any other suitable means.

The combination of the automatic driver system 15 and the apparatus 10 may be referred to as an autonomous driving system, i.e. one capable of performing behaviour and trajectory planning and subsequent control of the host vehicle.

In the example embodiment shown in FIG. 1B, the apparatus 10 and the automatic driver system 15 are illustrated as separate devices. The functionalities of the apparatus 10 and the automatic driver system 15 may alternatively be provided by an appropriately configured single device, e.g. an appropriately programmed computer processor.

Alternatively, the apparatus 10 may be used to determine whether trajectories are invalid as part of simulation of autonomously controlled vehicles or as part of testing and analysis of autonomous driving algorithms, such as autonomous driving algorithms based on statistical models, for example. For example, when training Artificial Intelligence or machine learning models, it is often useful to have a terminating condition, as in reinforcement learning, for example, where the agent learning has either succeeded or failed. As such, valid planned trajectories that are suitable for use in autonomous control of the vehicle 1 modeled by the first model vehicle may not necessarily be used to control the vehicle 1.

As will be apparent from the present disclosure, in order to for the validity determining module 14 of the apparatus 10 to determine that the planned trajectory is invalid, autonomously controlling the vehicle 1 in accordance with the planned trajectory may, for at least one time instant, bring the first model vehicle within a certain lateral distance of the second model vehicle O, i.e. within the lateral range of the second model vehicle. As such, the apparatus 10 of FIG. 1A may allow a planned trajectory to be determined as invalid if a safe lateral distance to the second model vehicle is not maintained.

However, in order for the validity determining module 14 to determine that the planned trajectory is invalid, at the at least one time instant at which the lateral position of the first model vehicle is in within the first lateral range, the lateral position of the first model vehicle may also be within a lane boundary region. As such, in cases where a lateral position of the first model vehicle at a particular time instant is within a region of the lane 21C, in which the second model vehicle O is driving, directly ahead of the second model vehicle O or within a region of the lane 21C, in which the second model vehicle O is driving directly behind of the second model vehicle O (that is, in a case where a lateral position of the first model vehicle at a particular time instant is within a certain distance of the centre of that lane 21C in which the second model vehicle is driving), the condition (i) above will not be satisfied.

Accordingly, in cases where the second model vehicle O represents another road-user that trails the first model vehicle at a dangerously close distance or that moves into a lane in which the first model vehicle is driving at a dangerously close distance behind the first model vehicle, a planned trajectory that may cause the vehicle 1 to be autonomously controlled to remain in the lane in which it is driving may not be determined as invalid, even though the lateral position of the first model vehicle at most, if not all, of the plurality of time instants for such a planned trajectory may be within the determined lateral range of the second model vehicle. In particular, for a planned trajectory that does not cause a switching of lanes, the first model vehicle normally does not enter the lane boundary regions of the lane in which it is driving but will remain near the centre of the lane such that the second part of condition (i) will not be satisfied.

Therefore, the apparatus 10 may avoid that planned trajectories that represent a best response (e.g. remaining in a same lane) to the unsafe driving of another road user are determined invalid.

Furthermore, in order to for the validity determining module 14 to determine that the planned trajectory is invalid, at the at least one time instant at which the first model vehicle is within the lateral range of the second model vehicle O and within a lane boundary region 23A, 23B, 23C, 23D, the direction of the lateral velocity of the first model vehicle may be towards the second model vehicle O and a magnitude of the lateral acceleration of the first model vehicle away from the second model vehicle O may be less than a predetermined lateral deceleration of the first model vehicle.

In cases where the second model vehicle represents another road-user that trails the first model vehicle at a dangerously close distance or that moves into a lane in which the first model vehicle is driving at a dangerously close distance behind the first model vehicle, a planned trajectory that may cause the vehicle 1 to be autonomously controlled to switch to another lane may result in the direction of the lateral velocity of the first model vehicle being away from the second model vehicle O and/or the lateral acceleration of the first model vehicle away from the second model vehicle O being greater than or equal to a predetermined lateral deceleration of the first model vehicle. In particular, in such cases, in which the second model vehicle O is driving in a same lane as the first model vehicle, moving to another lane by the first model vehicle result in an increase in the lateral distance between the first model vehicle and the second model vehicle O, which in turn necessities the first model vehicle laterally accelerating away from the second model vehicle O and/or the lateral velocity of the first model vehicle being away from the second model vehicle O.

Therefore, in such cases where the second model vehicle O represents another road-user that trails the first model vehicle at a dangerously close distance or that moves into a lane in which the first model vehicle is driving at a dangerously close distance behind the first model vehicle, a planned trajectory that may cause the vehicle 1 to be autonomously controlled to switch into a different lane may not be determined as invalid, as condition (ii) will not be satisfied.

Therefore, the apparatus 10 may further avoid that other planned trajectories that represent a best response (e.g. switching to another lane) to the unsafe driving of another road user are determined invalid.

However, the apparatus 10 may still determine as invalid planned trajectories that may, for example, cause the vehicle 1 to be autonomously controlled to move into a same lane as the second model vehicle O at a dangerously close distance or otherwise move to a dangerously close lateral distance to the second model vehicle O (i.e. planned trajectories that cause unsafe driving on behalf of the first model vehicle) as in these cases, the first model vehicle may have to pass through a lane boundary region, the lateral velocity of the first model vehicle may need to be towards the second model vehicle O and the first model vehicle may either accelerate towards the second model vehicle O or have minimal acceleration away from the second model vehicle O.

Therefore, the apparatus 10 may ensure that planned trajectories that may cause the vehicle 1 to be autonomously controlled to drive unsafely may be invalidated.

Furthermore, by obtaining a first vehicle state and a second vehicle state for each of the plurality of time instants and determining whether the planned trajectory is invalid when conditions (i) and (ii) are satisfied for even one time instant of the plurality of time instants, the apparatus 10 may allow the safety of the entire planned trajectory to be analysed.

As such, the apparatus 10 may address one or more of the issues outlined above in relation to conventional approaches to trajectory validation.

Figure 3:
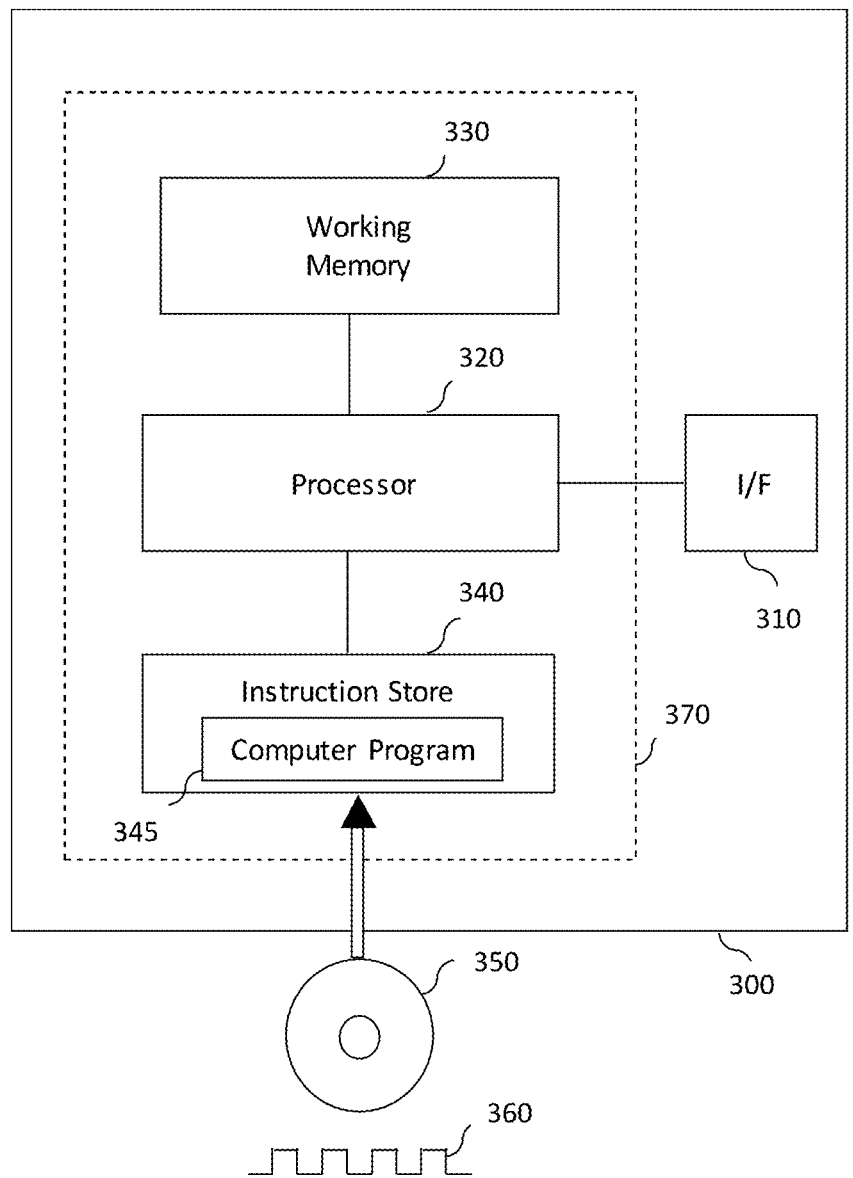
FIG. 3 is a block diagram illustrating an example implementation of the apparatus of the example embodiment in programmable signal processing hardware.

FIG. 3 is a schematic illustration of programmable signal processing apparatus 300, which may be configured to implement the functionality of the apparatus 10. The signal processing apparatus 300 includes an interface module 310 for receiving information and data about the vehicle 1 and its environment. The signal processing apparatus 300 further includes a processor (CPU) 320 for controlling the apparatus 10, a working memory 330 (e.g. a random-access memory) and an instruction store 340 storing a computer program comprising computer-readable instructions which, when executed by the processor 320, cause the processor 320 to perform the processing operations of the apparatus 10. The instruction store 340 may include a ROM (e.g. in the form of an electrically erasable programmable read-only memory (EEPROM) or flash memory) which is pre-loaded with the computer-readable instructions. Alternatively, the instruction store 340 may include a RAM or similar type of memory, and the computer-readable instructions can be input thereto from a computer program product, such as a computer-readable storage medium 350 such as a CD-ROM, etc. or a computer-readable signal 360 carrying the computer-readable instructions.

In the present example embodiment, the combination 370 of the hardware components shown in FIG. 3, comprising the processor 320, the working memory 330 and the instruction store 340, is configured to implement the functionality of each of the component modules of the apparatus 10 shown in FIG. 1A.

Figure 4:
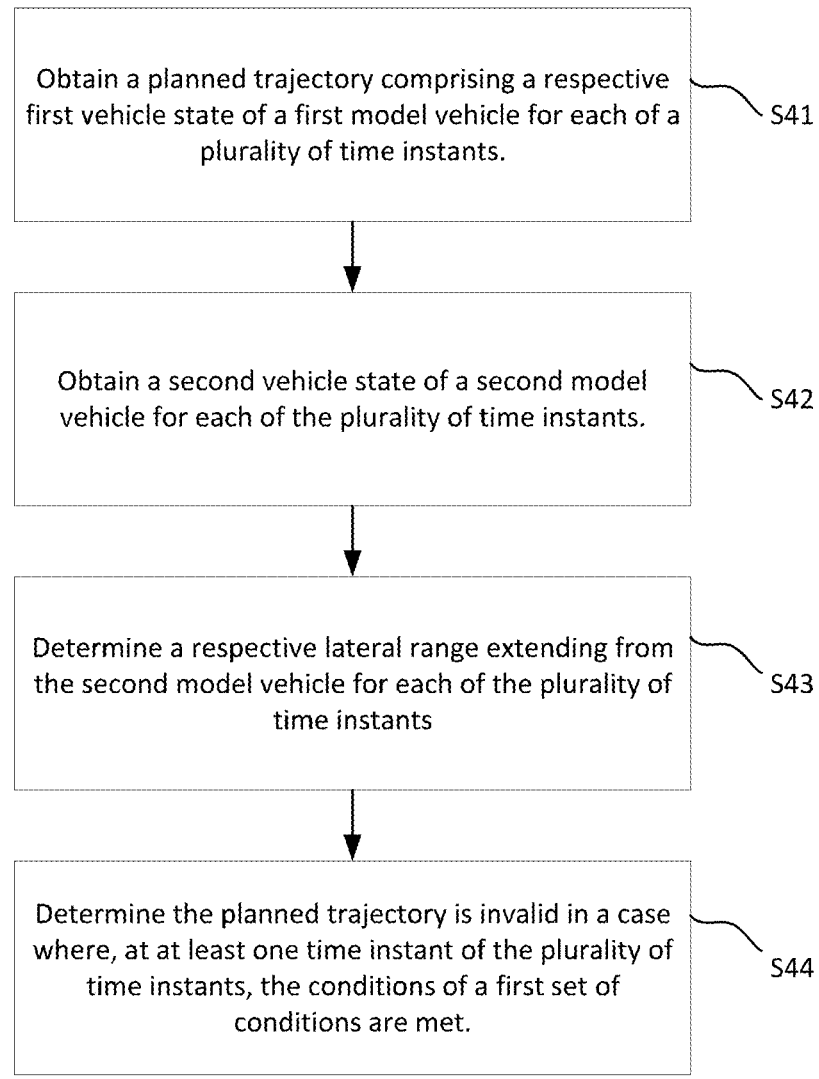
FIG. 4 is a flow diagram illustrating a process by which the apparatus of the example embodiment determines a target lateral acceleration of a host vehicle.

FIG. 4 is a flow diagram illustrating a process by which the apparatus 10 of FIG. 1A determines whether a planned trajectory of a first model vehicle over a model of a road 20 along which the first model vehicle and a second model vehicle O are traveling, for use in autonomous control of a vehicle 1 modeled by the first model vehicle, is invalid. The model of the road 20 includes a plurality of lanes defined by a plurality of lane boundaries.

In process step S41 of FIG. 4, the planned trajectory obtaining module 11 obtains the planned trajectory. The planned trajectory comprising a respective first vehicle state of the first model vehicle defined relative to the model of the road 20 for each of a plurality of time instants, each first vehicle state being defined by a respective lateral position of the first model vehicle, a respective lateral velocity of the first model vehicle and a respective lateral acceleration of the first model vehicle.

The planned trajectory obtaining module 11 may be configured to obtain the planned trajectory in any suitable form.

For example, the apparatus 10 may, as in the present example embodiment, be configured to store the model of the road 20. The planned trajectory obtaining module 11 may, as in the present example embodiment, be configured to receive a generated model of the road 20 including an estimated state of the environment of the vehicle at each of the plurality of time instants by any suitable means. By way of alternative, in some example embodiments, the planned trajectory obtaining module 11 may be configured to receive information from equipment such as radars, cameras, inertial measurement units etc., that collect data about the vehicle 1 and its environment. The information may be in the form or raw or processed data. In such example embodiments, the planned trajectory obtaining module 11 may be configured to generate the model of the road 20 including an estimated state of the environment of the vehicle at each of the plurality of time instants using the received information.

In such example embodiments, in which the apparatus 10 stores the model of the road 20, the planned trajectory obtaining module 11 may, as in the present example embodiment, be configured to obtain the planned trajectory by receiving information describing the planned trajectory in any suitable form from any entity capable of generating planned trajectories (e.g. an apparatus implementing an autonomous driving algorithm based on statistical models) and determining the respective first vehicle state of the first model vehicle for each of a plurality of time instants using the received information describing the planned trajectory and the stored model of the road 20.

By way of alternative, the planned trajectory obtaining module 11 may be configured to obtain the planned trajectory by receiving the respective first vehicle state of the first model vehicle for each of a plurality of time instants, e.g. in the form of an ordered plurality of first vehicle states, from any suitable entity that may generate the first vehicle states. For example, an apparatus implementing an autonomous driving algorithm based on statistical models may, further to generating trajectories, may determine the first vehicle states corresponding to a trajectory and provide the first vehicle states to the planned trajectory obtaining module as the planned trajectory. In a simple form, the planned trajectory obtaining module 11 may, for example, be configured to obtain, as the respective first vehicle state of the first model vehicle defined relative to the model of the road 20 for each of a plurality of time instants, a set of values for each of the plurality of time instants.

In such example embodiments, the apparatus 10 may also store the model of the road 20 or may be provided with only the information needed to perform the process of FIG. 4, e.g. the positions of the centres of the lanes 21A, 21B, 21C of the road 20, the width of the lanes 21A, 21B, 21C or the positions of the lane boundaries 22A, 22B, 22C, 22D, and the width of the lane boundary regions 23A, 23B, 23C, 23D or the width of the lateral offset $\Delta y_{bias}$.

By way of further example, the planned trajectory obtaining module 11 may be configured to obtain the planned trajectory by any suitable means known to those versed in the art. For example, the planned trajectory obtaining module 11 may receive the planned trajectory via a direct communication link (which may be provided by any suitable wired or wireless connection, e.g. a Universal Serial Bus (USB) or a Bluetooth™ connection), or an indirect communication link (which may be provided by a network comprising a Local Area Network (LAN), a Wide Area Network (WAN) and/or the Internet). Furthermore, the planned trajectory may be obtained by the planned trajectory obtaining module 11 acquiring (e.g. by reading from a storage medium such as a CD or hard disk, or receiving via a network such as the Internet) a planned trajectory that has been prepared in advance.

In process step S42 of FIG. 4, the second vehicle state obtaining module 12 obtains a second vehicle state of the second model vehicle O defined relative to the model of the road 20 for each of the plurality of time instants, each second vehicle state being defined by a respective lateral position of the second model vehicle O in the model of the road 20.

The second vehicle state obtaining module 12 may be configured to receive the second vehicle states for each of the plurality of time instants in any of the forms and by any of the means discussed above in relation to process step S41 of the FIG. 4.

In process step S43 of FIG. 4, the lateral range determining module 13 determines, for each of the plurality of time instants, a respective lateral range 40 (shown in FIG. 6A) extending from the second model vehicle O, using a respective lateral position of the second model vehicle O relative to a centre of a lane 21C among the plurality of lanes in which the second model vehicle O is located.

The respective lateral range 40 determined for each of the plurality of time instants may correspond to a safe lateral distance such as, for example, a distance required to perform a lateral emergency manoeuvre of reducing lateral velocity until the vehicle 1 is being driven in a straight line. As such, the lateral range 40 may be considered to define an extent on either side of the second model vehicle in which the presence of the second model vehicle may be expected to affect the autonomous control of the vehicle 1, e.g. by placing some limitation of its lateral movement, velocity or acceleration, in order to ensure safe driving of the autonomously controlled vehicle 1.

By way of example, the lateral range determining module 13 may, as in the present example embodiment, determine the respective lateral range 40 for each of the plurality of time instants using the respective lateral position of the second model vehicle O relative to a centre of the lane 21C by evaluating, for each of the plurality of time instants, one or more functions that map a set of one or more input parameters or variables, including the respective lateral position of the second model vehicle O relative to a centre of the lane 21C, to a single output value of the respective lateral range.

By way of alternative, in some example embodiments the lateral range determining module 13 may determine the respective lateral range 40 for each of the plurality of time instants by setting the lateral range 40 as a predetermined distance extending in a first lateral direction and in a second lateral direction from the lateral position of the second model vehicle O. That is, the respective lateral range 40 for each of the plurality of time instants may extend on either side of the second model vehicle in the y-axis.

In such example embodiments, the lateral range determining module 13 may, for example, use a respective lateral position of the second model vehicle O relative to a centre of a lane 21C among the plurality of lanes in which the second model vehicle O is located to determine the respective lateral range 40 for each of the plurality of time instants in that the predetermined distance set for each of the plurality of time instants is selected from a plurality of predetermined distances based on the respective lateral position of the second model vehicle O relative to a centre of a lane 21C among the plurality of lanes in which the second model vehicle O is located. For example, a larger predetermined distance may be selected where the distance between the lateral position of the second model vehicle O and the centre of the lane 21C in which it is driving is relatively large (e.g. when the second model vehicle O is switching lanes). Alternatively, the predetermined distance may have a fixed or constant value for each of the plurality of time instants and the respective lateral position of the second model vehicle O relative to a centre of a lane 21C among the plurality of lanes in which the second model vehicle O is located may be used only to determine from a lateral position from which the respective lateral ranges 40 may extend.

In general, by using the respective lateral position of the second model vehicle O relative to a centre of a lane 21C among the plurality of lanes in which the second model vehicle O is located to determine the respective lateral range 40 for each of the plurality of time instants such that the respective lateral range 40 increases with an increasing distance between the lateral position of the second model vehicle O and the centre of the lane 21C in which it is driving, the respective lateral ranges 40 may, for example, be defined to reach past the next lane of the second model vehicle O when it is performing a lane switch such that the first model vehicle is prohibited from performing a simultaneous lane switch into the same lane.

Additionally or alternatively, in example embodiments such as the present example embodiment, in which the lateral range determining module 13 determines the respective lateral range 40 for each of the plurality of time instants by evaluating one or more functions, the one or more input parameters or variables of the one or more functions may include any suitable parameter(s) included in the second vehicle state.

By way of example, in example embodiments such as the present example embodiment, in which the second vehicle state for each of the plurality of time instants is further defined by a respective lateral velocity of the second model vehicle O, the lateral range determining module 13 may be further configured to determine the respective lateral range 40 for each of the plurality of time instants using the respective lateral velocity of the second model vehicle. By way of example, the lateral range 40 determined for a particular time instant may be determined such that the lateral range 40 increases with increasing lateral velocity of the second model vehicle O.

This may help to ensure that, in a case where the second model vehicle O is moving at a relatively high lateral velocity and, as such, may approach the first model vehicle relatively quickly, the determined lateral range 40 used to determine whether the planned trajectory of the first model vehicle is valid is wider, and thus more planned trajectories may potentially be invalidated relative to the case where the second model vehicle O is moving at a relatively low lateral velocity. As such, it may be better ensured that any planned trajectory determined to be a valid planned trajectory allows the first model vehicle sufficient time and lateral distance to react where the second model vehicle O is moving at a relatively high lateral velocity.

By way of more detailed example, the lateral range determining module 13 may, as in the present example embodiment, determine the respective lateral range 40 for each of the plurality of time instants by firstly defining the following functions and sets:

$$\text{clip}(x, a, b) = \min(\max(a, x), b) \qquad (2)$$

$$\text{interp}([x_1, x_2 \ldots x_n], [y_1, y_2 \ldots y_n], x) = \qquad (3)$$

$$\begin{cases} y_1, & x \leq x_1 \\ y_k + a(y_{k+1} - y_k), & x_k \leq x \leq x_{k+1} \\ a = \dfrac{x - x_k}{x_{k+1} - x_k} \\ y_n, & x \geq x_n \end{cases}$$

$$ys = [-0.5, -\Delta y_{bias}, \Delta y_{bias}, 0.5] \qquad (4)$$

$$rs = [1.5 - \Delta y_{bias}, 1, 1 - \Delta y_{bias}, 1.5 - \Delta y_{bias}], \qquad (5)$$

and defining the following functions for use in determining a left part and a right part of the lateral range:

$$\Delta y_{base}(y) = \text{interp}(ys, rs, \tilde{y}), \text{ where } \tilde{y} \in [-0.5, 0.5) \text{ and } \tilde{y} = \qquad (6)$$

$$(y + 0.5 \bmod 1) - 0.5$$

$$\Delta y_{v,range}(y, v) = \qquad (7)$$

$$\text{interp}([0, \Delta y_{bias}, 0.5], [0, 1 - \Delta y_{bias}, 0], \tilde{y})\text{clip}\left(\frac{v - v_\mu}{v_{min,switch} - v_\mu}, 0, 1\right)$$

$$\Delta y_{range}(y, v) = \Delta y_{base}(y) + \Delta y_{v,range}(y, v). \qquad (8)$$

In particular, using function (8) above, the left part of the lateral range may be determined as $\Delta y_{range}(y_i, v_{y,i})$, and the right part of the lateral range may be determined by antisymmetry as $\Delta y_{range}(-y_i, -v_{y,i})$.

In equation (7) above, $v_\mu$ is a threshold velocity (e.g. the peak lateral velocity to be used for biasing while driving within a same lane) below which the lateral range does not increase in order to avoid an increase of the lateral range being caused by small oscillations of the second model vehicle O and $v_{min,switch}$ is a minimum lateral velocity to be used during lane switching or that is indicative of lane switching. By defining the functions for determining the left and right parts of the lateral range 40 separately, it can be ensured that the extent of the lateral range 40 is only increased on the side of the lane in the direction of the velocity.

Figure 5:
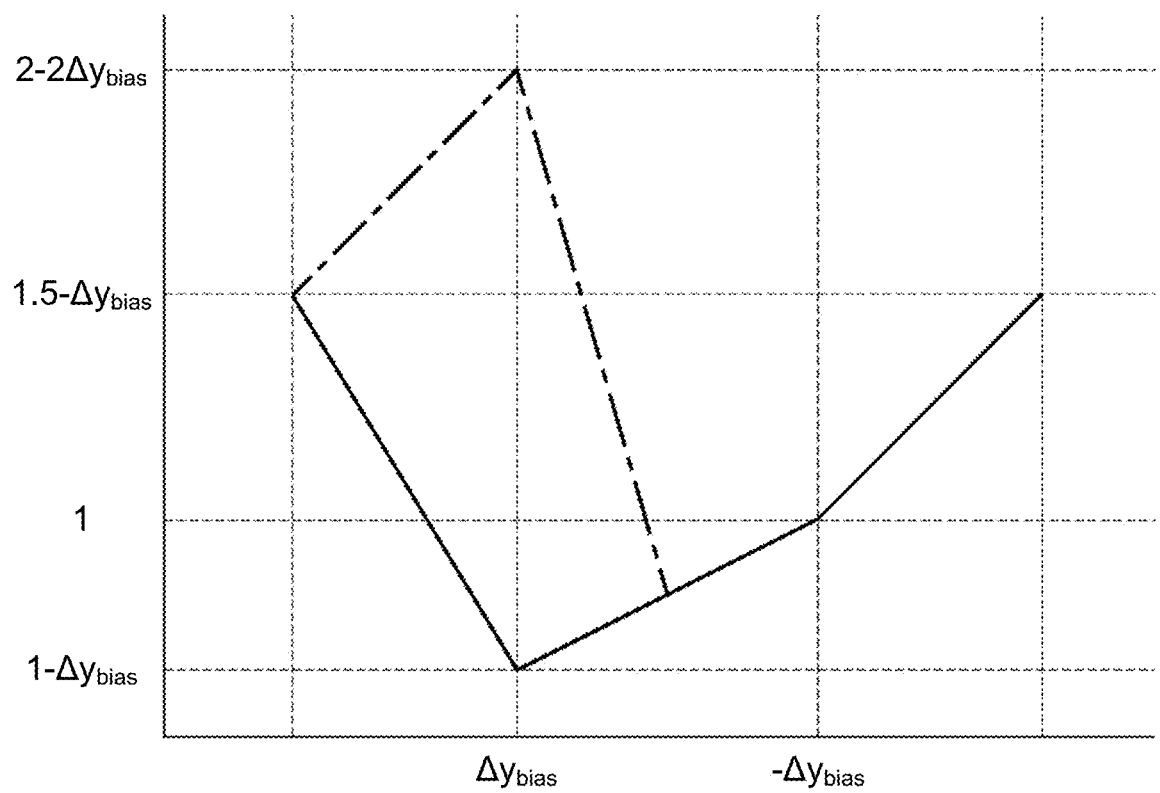
FIG. 5 is a plot illustrating a variation of a left range calculated using a lateral range function described herein.

FIG. 5 is a plot illustrating a variation of a left range with position within a lane, which has been calculated for an object component using a lateral range function described herein so as to ensure that the component is constant outside of the bias region whenever the vehicle is in the bias region and has a low lateral velocity. The range with lateral velocity $v \leq v_\mu$ is shown by the solid line in FIG. 5, while the range with lateral velocity $v \geq v_{min,switch}$ is shown by the dotted line in FIG. 5. In between, it is given by linear interpolation between the two. As illustrated in FIG. 5, the left range decreases when moving left from the center and increases when moving right. When the velocity to the left is higher, it will instead have an increased range moving away from the lane center to the left.

In sets (4) and (5) and functions (6) to (8) above, it is assumed that the y-axis is scaled to the lane width such that each increment or decrement of 1 in the y-axis represents the width of one lane, as in the present example embodiment, such that the value of 0.5 may represent the half the width of a lane of the road 20 (i.e. a distance between a centre of a lane and a boundary thereof). Alternatively, in example embodiments in which the y-axis is not so scaled, the value of 0.5 in sets (4) and (5) and functions (6) to (8) may be replaced with any suitable value corresponding to half of the width of a lane of the road 20 and other values (e.g. 1.5, 1, etc.) may be scaled accordingly.

Figure 6A:
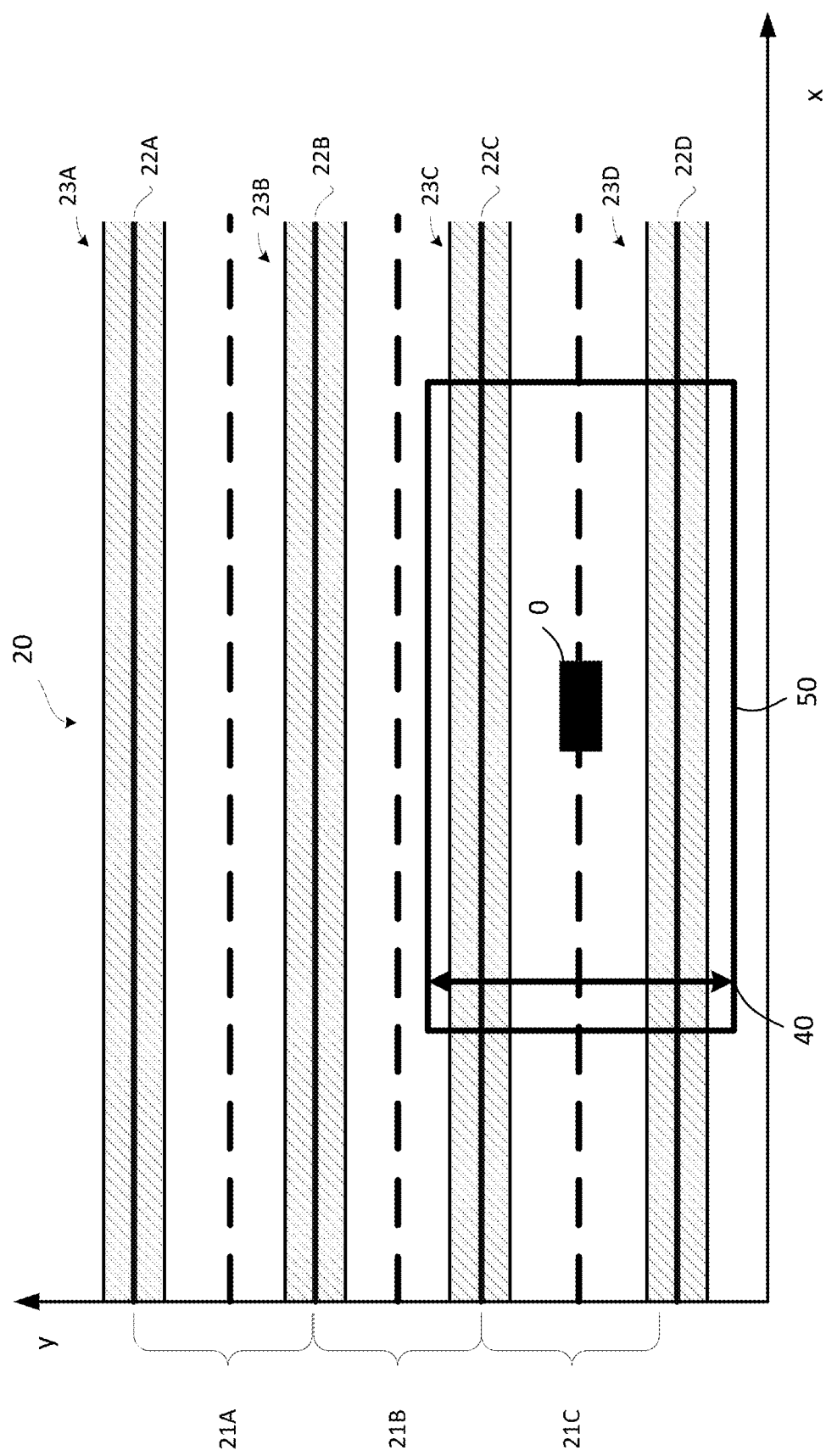
FIG. 6A is a schematic illustration showing an example of the lateral range determined by the lateral range determining module of the apparatus of FIG. 1.

FIG. 6A is a schematic illustration showing an example of the lateral range 40 determined by the lateral range determining module 13 of the apparatus 10 of FIG. 1. The lateral range 40 may represent a respective lateral range defined for a particular time instant among the plurality of time instants.

The lateral range 40 shown in FIG. 6A may, as in the present example embodiment, be determined using the functions (6) to (8) above. By way of alternative, the lateral range 40 may be determined by any suitable means as discussed above.

In the example shown in FIG. 6A, the lateral range 40 serves to define a region 50 extending around the second model vehicle O, which region extends not only laterally, along the y-axis but also longitudinally, along the x-axis. The longitudinal length of the region 50 may, for example, be defined by the information obtained by the second vehicle state obtaining module 12.

The second model vehicle state obtaining module 12 may be configured to consider only additional model vehicles that are within a predetermined longitudinal distance of the first model vehicle. As such, the second vehicle state may only be obtained for a second model vehicle which is within such a predetermined longitudinal distance of the first model vehicle.

The apparatus 10 may, as in the present example embodiment, be further arranged to determine a longitudinal range extending from the second model vehicle O in a first longitudinal direction and in a second longitudinal direction opposite to the first longitudinal direction (i.e. on either side of the second model vehicle O in the x-axis) as the longitudinal length of the region 50. In such example embodiments, the lateral range determining module 13 may be further arranged to determine the longitudinal range, or the apparatus 10 may include an additional module which is arranged to determine a longitudinal range.

By way of an example, the determined longitudinal range may have a fixed value. The fixed value may, for example, correspond to a maximum longitudinal safe distance defined as a distance required for the vehicle 1 to perform a longitudinal emergency manoeuvre such as braking to stop in time to avoid a collision with another vehicle in a scenario where the vehicle 1 is traveling at a maximum permitted speed for vehicle 1 on public roads (e.g. a speed limit on a motorway) and the other vehicle is assumed to come to a stop instantaneously (when involved in a collision, for example).

Alternatively, the longitudinal range may, as in the present example embodiment, be determined by evaluating one or more functions that map a set of one or more input parameters or variables relating, for example, to the second model vehicle O to a single output value of the longitudinal range.

Additionally, or alternatively, the apparatus 10 may, as in the present example embodiment, be arranged to determine a respective longitudinal range for each of the plurality of time instants. Alternatively, the apparatus 10 may be arranged to determine a single longitudinal range common to the plurality of time instants.

Additionally or alternatively, the apparatus 10 may, as in the present example embodiment, determine, for each of the plurality of time instants, a respective first longitudinal range extending from and ahead of the second model vehicle O and to determine, for each of the plurality of time instants, a respective second longitudinal range extending from and behind the second model vehicle O. As such, the region 50 may be defined such that its longitudinal extent ahead of the second model vehicle O differs from its longitudinal extent to the rear of the second model vehicle O. As such, it is may be possible to take into account how the respective directions of movement of the first and second model vehicles may affect the safe longitudinal distance required for the vehicle 1 to perform a longitudinal emergency manoeuvre such as braking in time to avoid a collision with the second model vehicle.

By way of example, in example embodiments such as the present example embodiment, in which the first vehicle state is further defined by a longitudinal position of the first model vehicle and a longitudinal velocity of the first model vehicle, and the second vehicle state is further defined by a longitudinal velocity of the second model vehicle O and a longitudinal acceleration of the second model vehicle O, the apparatus 10 may, as in the present example embodiment, determine, for each of the plurality of time instants, a respective first longitudinal range extending from and ahead of the second model vehicle O using the respective longitudinal velocity of the first model vehicle, the respective longitudinal velocity of the second model vehicle O, the respective longitudinal acceleration of the second model vehicle O, a predefined reaction time of the second model vehicle O, a first predetermined longitudinal deceleration of the second model vehicle O, and a first predetermined longitudinal deceleration of the first model vehicle. The apparatus 10 may further determine, for each of the plurality of time instants, a respective second longitudinal range extending from and behind the second model vehicle O using the respective longitudinal velocity of the first model vehicle, the respective longitudinal velocity of the second model vehicle O, a predefined reaction time of the first model vehicle, a second predetermined longitudinal deceleration of the first model vehicle, and a second predetermined longitudinal deceleration of the second model vehicle O.

By way of example, the first predetermined longitudinal deceleration and the second predetermined longitudinal deceleration of the second model vehicle O may, as in the present example embodiment, correspond to a minimum required emergency braking capability and a maximum achievable emergency braking response of the second model vehicle, respectively, such that the first predetermined longitudinal deceleration of the second model vehicle O has a smaller magnitude than the second predetermined longitudinal deceleration of the second model vehicle O. Additionally, the first predetermined longitudinal deceleration and the second predetermined longitudinal deceleration of the first model vehicle may, as in the present example embodiment, correspond to a maximum achievable emergency braking response and a minimum required emergency braking capability of the first model vehicle, respectively, such that the first predetermined longitudinal deceleration of the first model vehicle has a greater magnitude than the second predetermined longitudinal deceleration of the first model vehicle.

By way of more detailed example, the apparatus 10 may, as in the present example embodiment, determine a respective longitudinal range for each of the plurality of time instants using the following functions:

$$\Delta x_{front}(l, v, l_o, v_o, a_o) = \tag{9}$$

$$\frac{l_o}{2} + \frac{l}{2} + \max\left(0, \frac{v_o + a_o t_{o,r}}{2} t_{o,r} + \frac{(v_o + a_o t_{o,r})^2}{-2b_{o,min}} - \frac{v^2}{-2b_{max}}\right)$$

$$\Delta x_{back}(l, v, l_o, v_o) = \frac{l_o}{2} + \frac{l}{2} + \max\left(0, vt_r + \frac{v^2}{-2b_{min}} - \frac{v_o^2}{-2b_{o,max}}\right), \tag{10}$$

where $\Delta x_{front}$ corresponds to a safety distance of the vehicle 1 in front of other vehicles, $t_{o,r}$ is a reaction time in seconds (s) of another road user, $b_{max}$ is a maximum braking deceleration in ms$^{-2}$ of the vehicle 1 and $b_{o,min}$ is a minimum emergency braking response in ms$^{-2}$ of another road user. Furthermore, $\Delta x_{back}$ corresponds to a safety distance of the vehicle 1 behind other vehicles, $t_r$ is a reaction (adaptation) time in seconds of the vehicle 1 ($s$), $b_{o,max}$ is a maximum braking deceleration in ms$^{-2}$ of another road user and $b_{min}$ is a minimum emergency braking response (ms$^{-2}$) of the vehicle 1.

In particular, using functions (9) and (19) above, the first longitudinal range may be determined as $\Delta x_{front}(l, v_x, l_i, v_{x,i}, a_{x,i})$ and the second longitudinal range may be determined as $\Delta x_{back}(l, v_x, l_i, v_{x,i})$.

Figure 6B:
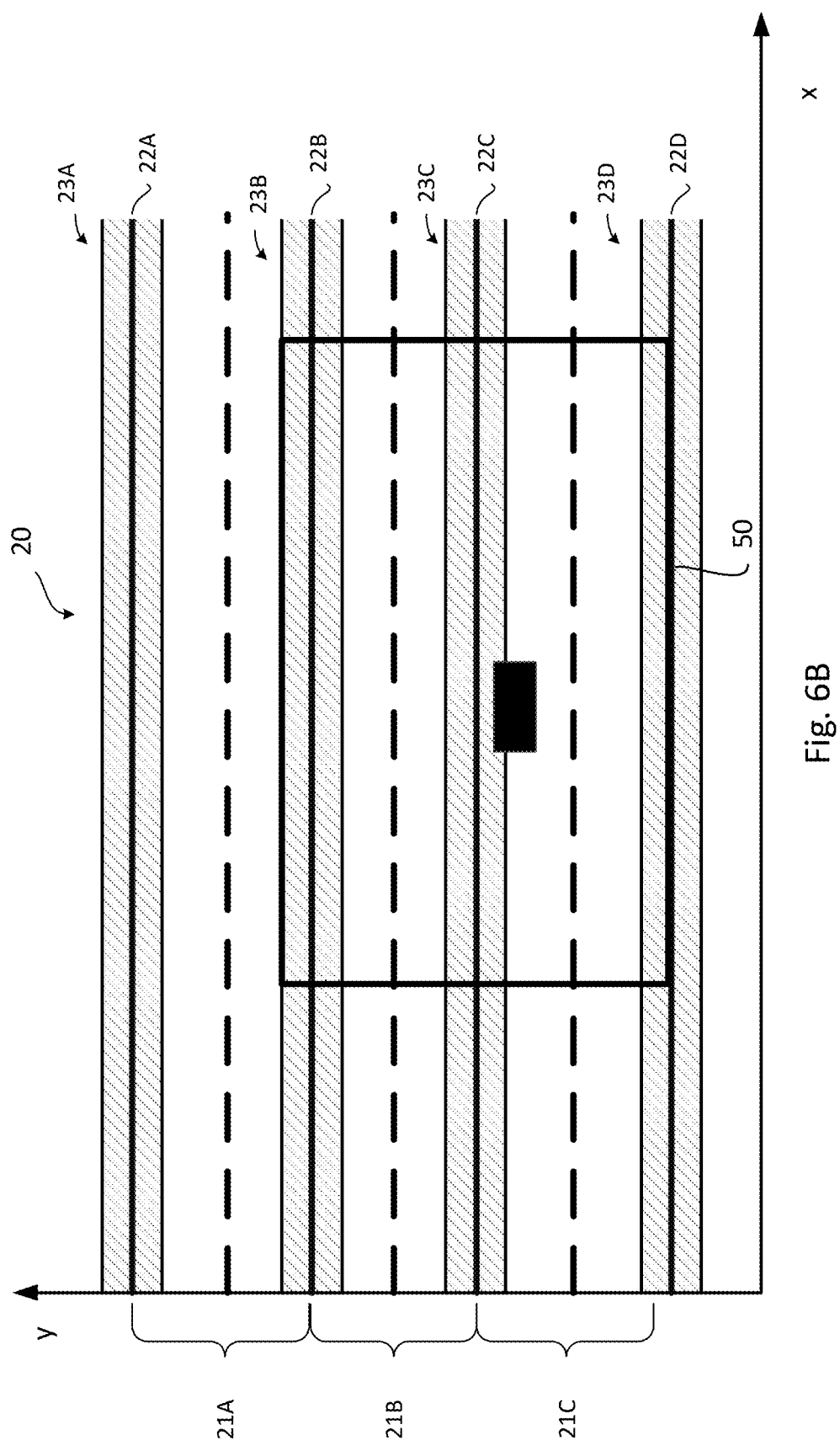
FIG. 6B is a schematic illustration showing an example of the lateral range determined by the lateral range determining module of the apparatus 10 of FIG. 1 at a particular time instant when the second model vehicle moves into the lane boundary region.

FIG. 6B is a schematic illustration showing an example of the lateral range 40 determined by the lateral range determining module 13 of the apparatus 10 of FIG. 1 at a particular time instant when the second model vehicle O moves into the lane boundary region 23C. In the example of FIG. 6B, the respective lateral range 40 for each of the plurality of time instants is determined in accordance with equations (6) to (9) above and is depicted by the region 50. However, in line with the discussion above, in some example embodiments, the region 50 may not actually be determined by the apparatus 10, in which case the region 50 may be shown in FIG. 6B for ease of visualization only.

As shown in FIG. 6B, although the second model vehicle O is in the same lane 21C as in FIG. 6A, the extent of the determined lateral range, as illustrated by region 50, increases significantly in the direction of lane 21B into which the second model vehicle O is moving. That is, the lateral ranges 40 reaches past the next lane of the second model vehicle O when it is performing a lane switch such that the first model vehicle may be prohibited from performing a simultaneous lane switch into the same lane 21B.

Additionally or alternatively, in example embodiments such as the present example embodiment, in which the lateral range determining module 13 determines a left part and a right part of the lateral range 40, the lateral range determining module 13 may, as in the present example embodiment, determine the respective lateral range 40 for each of the plurality of time instants such that the lateral extent of the second model vehicle O is taken into account.

Figure 6C:
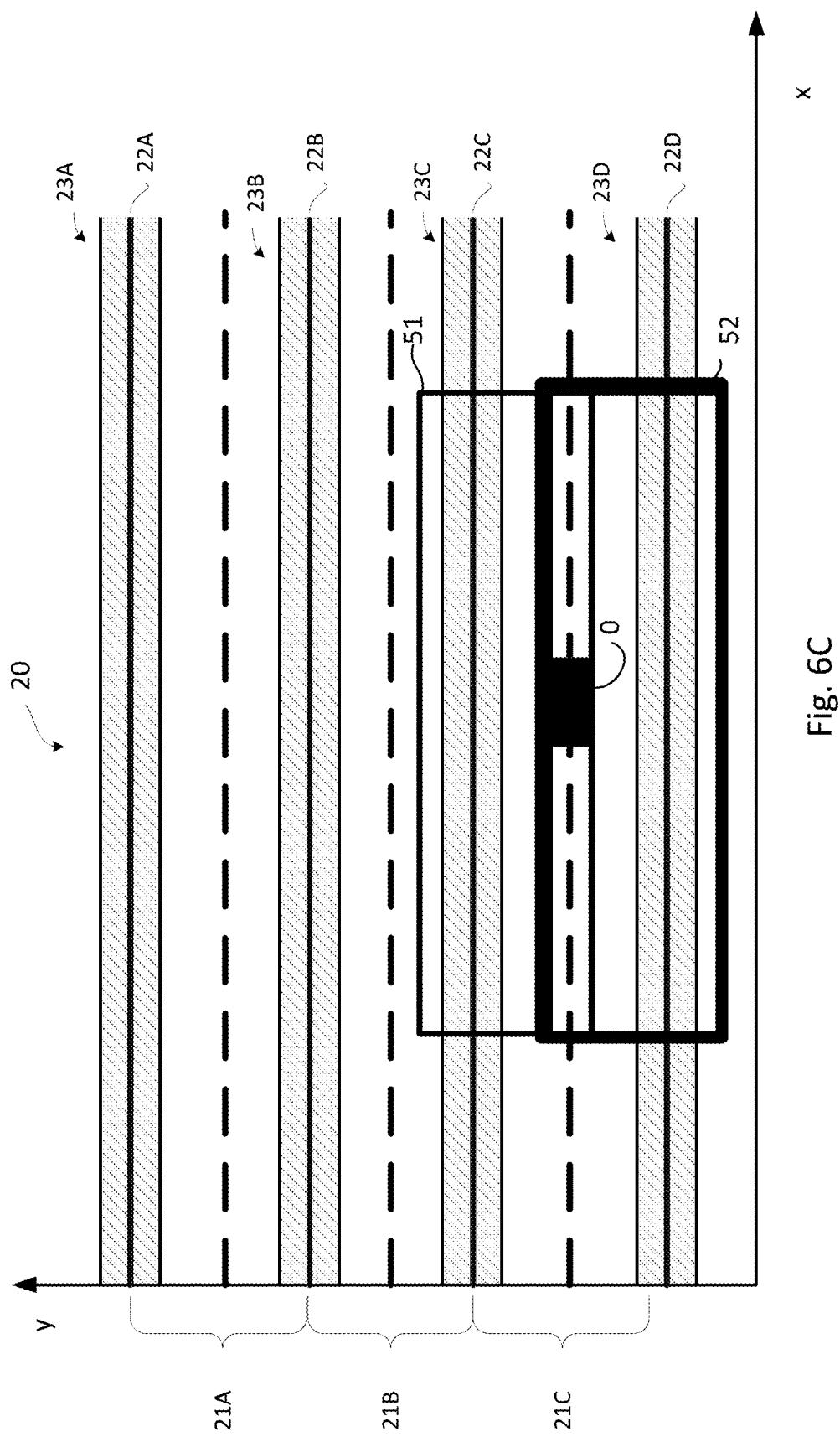
FIG. 6C is a schematic illustration showing a first example in which the lateral range determining module determines a left part and a right part of the lateral range of FIG. 6A.

By way of example, FIG. 6C is a schematic illustration showing a first example in which the lateral range determining module 13 determines a left part and a right part of the lateral range 40 of FIG. 6A. In the example of FIG. 6C, the left part and the right part of the lateral range are depicted by regions 51 and 52. However, in line with the discussion above, in some example embodiments, the regions 51 and 52 may not actually be determined by the apparatus 10, in which case these regions may be shown in FIG. 6C for ease of visualization only.

In the example of FIG. 6C, the left part 51 of the lateral range extends from a rightmost edge of the second model vehicle O and to the left of the second model vehicle O. Similarly, the right part 52 of the lateral range extends from a leftmost edge of the second model vehicle O and to the right of the second model vehicle O. It is noted that the terms 'left' and 'right' may refer more generally to a first lateral direction along the y-axis, and a second lateral direction, which is opposite to the first lateral direction, along the y-axis.

As such, in example embodiments such as the present example embodiment, in which the left part of the lateral range is determined as $\Delta y_{range}(y_i, v_{y,i})$ and the right part of the lateral range is determined as $\Delta y_{range}(-y_i, -v_{y,i})$ using function 8 above, the full extent of the left part 51 of the lateral range and the right part 52 of the lateral range may be respectively defined by the following ranges:

$$\left[y_i = \frac{w_o}{2}, y_i + \Delta y_{range}(y_i, v_{y,i})\right] \tag{11}$$

$$\left[y_i - \Delta y_{range}(-y_i, -v_{y,i}), y_i + \frac{w_o}{2}\right]. \tag{12}$$

By way of alternative, in example embodiments such as the present example embodiment, in which the lateral range determining module 13 determines a left part and a right part of the lateral range 40, the lateral range determining module 13 may not take the lateral extent of the second model vehicle O into account when determining the respective lateral range 40 for each of the plurality of time instants.

Figure 6D:
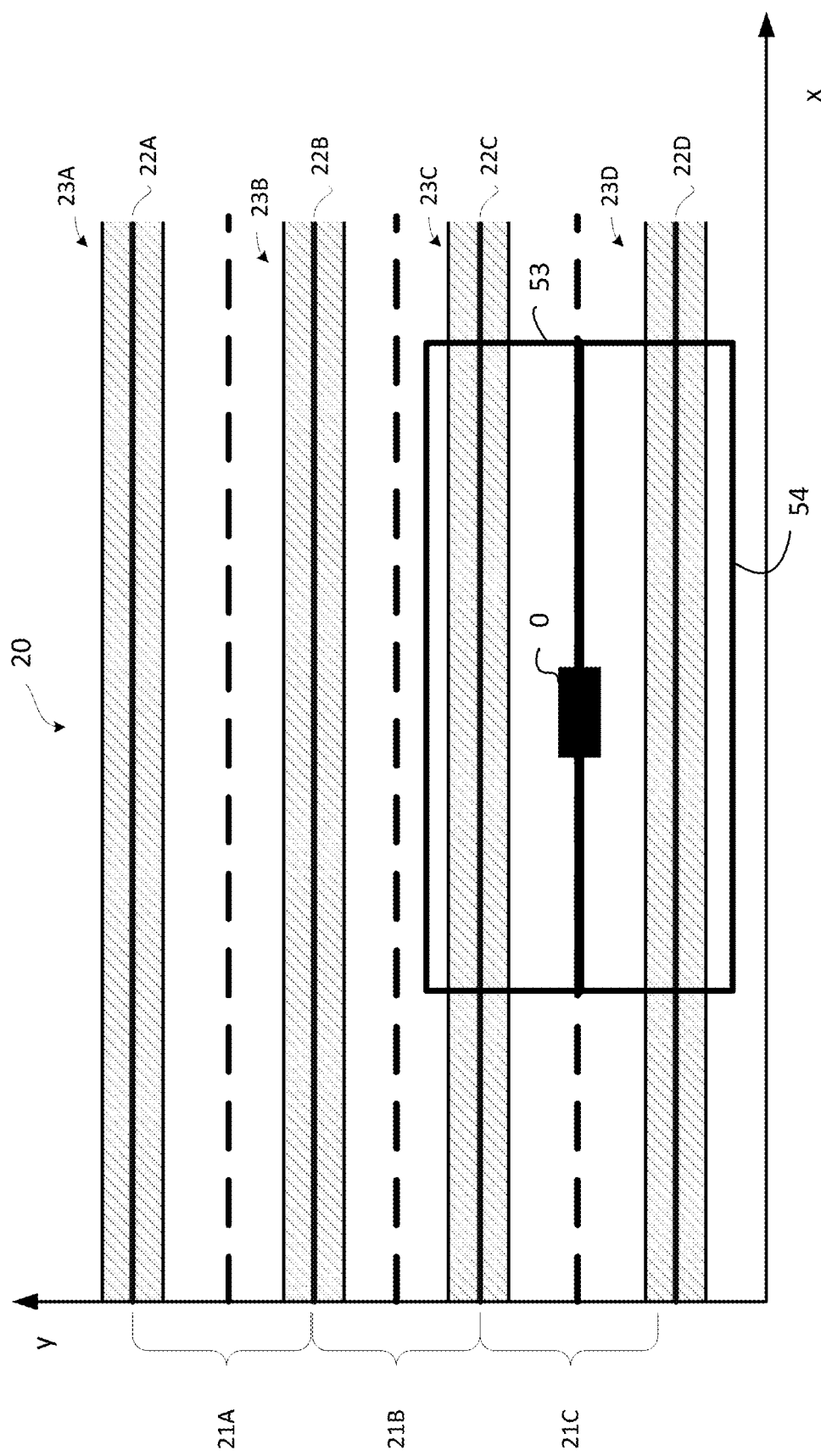
FIG. 6D is a schematic illustration showing a second example in which the lateral range determining module determines a left part and a right part of the lateral range of FIG. 6A.

By way of example, FIG. 6D is a schematic illustration showing a second example, in which the lateral range determining module 13 determines a left part and a right part of the lateral range 40 of FIG. 6A. In the example of FIG. 6D, the left part and the right part of the lateral range are depicted by regions 53 and 54. However, in line with the discussion above, in some example embodiments, the regions 53 and 54 may not actually be determined by the apparatus 10, in which case these regions may be shown in FIG. 6D for ease of visualization only.

In the example of FIG. 6D, the left part 53 of the lateral range extends from a lateral centre of the second model vehicle O and to the left of the second model vehicle O. Similarly, the right part 54 of the lateral range extends from a lateral centre of the second model vehicle O and to the right of the second model vehicle O. It is noted that the terms 'left' and 'right' may refer more generally to a first lateral direction along the y-axis, and a second lateral direction, which is opposite to the first lateral direction, along the y-axis.

Additionally, or alternatively, the lateral range determining module 13 may, as in the present example embodiment, be further arranged to determine any other lateral ranges useful in determining the validity of the obtained planned trajectory.

By way of example, the lateral range determining module 13 may, as in the present example embodiment, be further arranged to determine, for each of the plurality of time instants, a respective second lateral range extending from the second model vehicle O. The second lateral range and the second longitudinal range (which may, for example, be defined using equation (10) above) may, as in the present example embodiment, define a braking region of the model of the road extending in a first lateral direction and in a second lateral direction from a lateral centre of the first model vehicle.

The respective second lateral ranges may be determined by any of the means discussed above in relation to the respective lateral ranges. The respective second lateral ranges may, as in the present example embodiment, be determined using function (8) as described above in relation to the respective lateral range determined by the lateral range determining module 13.

By way of further example, in example embodiments such as the present example embodiment, in which the first vehicle state is further defined by a longitudinal position of the first model vehicle and the second vehicle state is further defined by a length of the second model vehicle and a width of the second model vehicle, the lateral range determining module 13 may, as in the present example embodiment, determine, for each of the plurality of time instants, a respective occupancy region which is occupied by the second model vehicle based on the length of the second model vehicle and the width of the second model vehicle. For example, the occupancy region may, as in the present example embodiment, correspond to the black rectangle indicated by the reference sign O in FIGS. 2B, and 6A to 6D.

Figure 7:
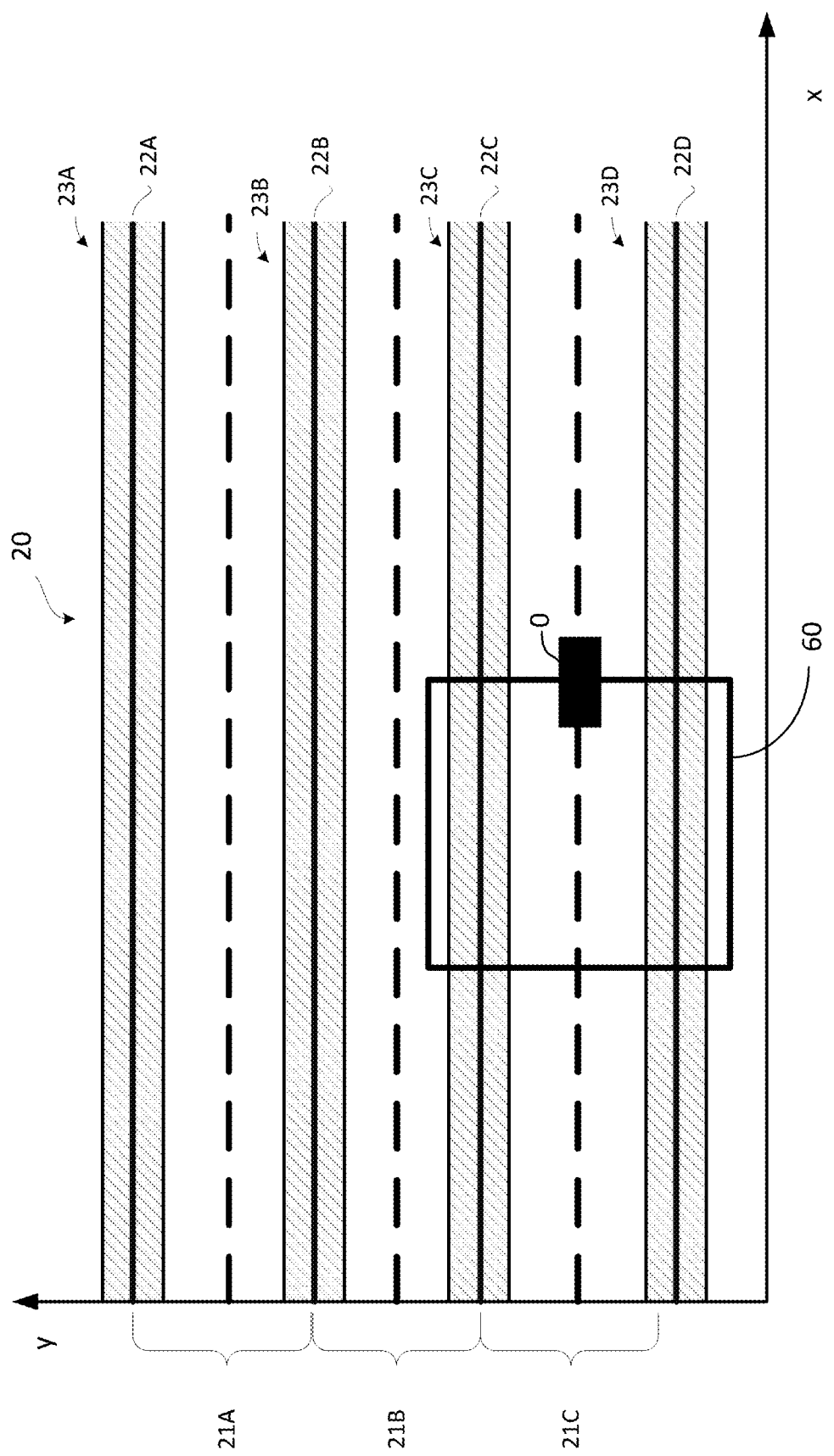
FIG. 7 is a schematic illustration showing an example of the braking region determined by the apparatus of FIG. 1.

FIG. 7 is a schematic illustration showing an example of the braking region 60 determined by the apparatus 10 of FIG. 1 and represents a region in which the vehicle 1 may be required to perform an emergency braking response. That is, if the vehicle 1 entered this region, the vehicle 1 may need to apply full emergency braking in order to avoid crashing in a case where the other road-user in front of the vehicle 1 performs an emergency braking response.

Referring again to FIG. 4, in process step S44 of this Figure, the validity determining module 14 determines that the planned trajectory is invalid in a case where, for the first vehicle state and the second vehicle state at one or more time instants of the plurality of time instants, the following conditions of a first set of conditions are satisfied:

(i). the lateral position of the first model vehicle is within the lateral range 40 of the second model vehicle O at the time instant and within a lane boundary region 23A, 23B, 23C, 23D extending along and comprising a lane boundary 22A, 22B, 22C, 22D of the plurality of lane boundaries; and (ii). a direction of the lateral velocity of the first model vehicle is towards the second model vehicle O and a magnitude of the lateral acceleration of the first model vehicle away from the second model vehicle O is less than a predetermined lateral deceleration of the first model vehicle.

By way of example, the predetermined lateral deceleration may be representative of a minimum required lateral deceleration of the vehicle 1 (i.e. an acceleration of the first model vehicle away from the second model vehicle O). In such cases, the magnitude of the lateral acceleration of the first model vehicle away from the second model vehicle O may be less than a predetermined lateral deceleration of the first model vehicle in a case where the lateral acceleration of the first model vehicle is towards the second model vehicle O and in a case where the lateral acceleration of the first model vehicle is away from the second model vehicle O, i.e. a deceleration, but the deceleration of the first model vehicle is less than the predetermined lateral acceleration.

By way of more specific example, the regions in which condition (i) above is satisfied at a given time instant t may, as in the present embodiment, be defined as follows for the second model vehicle O (where the subscript i denotes that the second model vehicle O may be the $i^{th}$ model vehicle among one or more model vehicles defined in the model of the road 20 in addition to the first model vehicle):

$$R_{cutl}(H_t, E_t) = \begin{cases} (x, y) \in R_l \text{ s.t.} x \in [x_i - \Delta x_{back}(l_i, v_{x,i}, l, v_x), x_i + \\ \Delta x_{front}(l_i, v_{x,i}, l, v_x, a_x)] \text{ and} \\ y \in \left[y_i - \Delta y_{range}(-y_i, -v_{y,i}), y_i + \frac{w_o}{2}\right] \text{ for some } O_{i,t} \in E_t \end{cases} \quad (13)$$

$$R_{cutr}(H_t, E_t) = \begin{cases} (x, y) \in R_l \text{ s.t. } x \in [x_i - \Delta x_{back}(l_i, v_{x,i}, l, v_x), x_i + \\ \Delta x_{front}(l_i, v_{x,i}, l, v_x, a_x)] \text{ and} \\ y \in \left[y_i - \frac{w_o}{2}, y_i + \Delta y_{range}(y_i, v_{y,i})\right] \text{ for some } O_{i,t} \in E_t \end{cases}, \quad (14)$$

where $R_{cutl}$ refers to the right part of the lateral range (i.e. the part intended to prevent the first model vehicle from cutting into a same lane as the second model vehicle O from the right), $R_{cutr}$ refers to the left part of the lateral range (i.e. the part intended to prevent the first model vehicle from cutting into a same lane as the second model vehicle O from the left), $R_l$ are the lane boundary regions 23A, 23B, 23C, 23D defined in equation (1) above, $H_t$ is the first vehicle state at the time instant t and $E_t$ is the state of the environment at the time instant t. It follows from equations (13) and (14) that the $R_{cutl}$ and $R_{cutr}$ are subsets of the $R_l$, and not the entire left or right part of the lateral range.

Correspondingly, sets of acceptable states $H_t$ of the first vehicle, for which condition (ii) above is satisfied at a given time instant t, may, as in the present embodiment, be defined as follows for $R_{cutl}$ and $R_{cutr}$, respectively:

$$P_{cutl} = \{H_t \text{ in } H \text{ s.t. } v_y < 0 \text{ or } a_y < -b_{y,min}\} \quad (15)$$

$$P_{cutr} = \{H_t \text{ in } H \text{ s.t. } v_y > 0 \text{ or } a_y > b_{y,min}\}, \quad (16)$$

where $b_{y,min}$ is the predetermined lateral deceleration.

As described above in relation to FIG. 1A, the process of FIG. 4 may allow the apparatus 10 to avoid that planned trajectories that represent a best response to unsafe driving of another road user are determined invalid while ensuring that planned trajectories that may cause the vehicle 1 to be autonomously controlled to drive unsafely may be invalidated.

Furthermore, by obtaining a first vehicle state and a second vehicle state for each of the plurality of time instants and determining whether the planned trajectory is invalid when conditions (i) and (ii) are satisfied for even one time instant of the plurality of time instants, the apparatus 10 may allow the safety of the entire planned trajectory to be analysed.

In some example embodiments, such as the present example embodiment, in which the apparatus 10 determines, for each of the plurality of time instants, a respective first longitudinal range extending from and ahead of the second model vehicle O and a respective second longitudinal range extending from and behind the second model vehicle O, the first set of conditions may, as in the present example embodiment, further include a condition that the longitudinal position of the first model vehicle is in the first longitudinal range or the second longitudinal range at the time instant.

Additionally or alternatively, in example embodiments, such as the present example embodiment, in which the apparatus 10 determines, for each of the plurality of time instants, a respective second lateral range extending from the second model vehicle O, the validity determining module 14 may, as in the present example embodiment, be further configured to determine that the planned trajectory is invalid in a case where, for the first vehicle state and the second vehicle state for at least one time instant of the plurality of time instants, the following conditions of a second set of conditions are satisfied:

(i). the longitudinal position of the first model vehicle is within the second longitudinal range at the time instant, (ii). the lateral position of the first model vehicle is within the second lateral range at the time instant, and (iii). a magnitude of the longitudinal acceleration of the first model vehicle away from the second model vehicle is less than the first predetermined longitudinal deceleration of the first model vehicle.

By way of example, the first predetermined longitudinal deceleration may be representative of a minimum required longitudinal deceleration of the vehicle 1 (i.e. an acceleration of the first model vehicle away from the second model vehicle O). In such cases, the magnitude of the lateral acceleration of the first model vehicle away from the second model vehicle O may be less than a predetermined lateral deceleration of the first model vehicle in a case where the lateral acceleration of the first model vehicle is towards the second model vehicle O and in a case where the lateral acceleration of the first model vehicle is away from the second model vehicle O, i.e. a deceleration, but the deceleration of the first model vehicle is less than the predetermined lateral acceleration.

By way of more specific example, the regions in which conditions (iii) and (iv) above are satisfied at a given time instant t may, as in the present embodiment, be defined as follows for the second model vehicle O (where the subscript i denotes that the second model vehicle O may be the $i^{th}$ model vehicle among one or more model vehicles defined in the model of the road 20 in addition to the first model vehicle):

$$R_b(H_t, E_t) = \begin{cases} (x, y) \in R^2 \text{ s.t. } x \in [x_i - \Delta x_{back}(l_i, v_{x,i}, l, v_x), x_i] \text{ and} \\ y \in [y_i - \Delta y_{range}(-y_i, -v_{y,i}), y_i + \Delta y_{range}(y_i, v_{y,i})], \\ \text{for some } O_{i,t} \in E_t \end{cases} \quad (17)$$

where $R_b$ refers to the braking region, $H_t$ is the first vehicle state at the time instant t and $E_t$ is the state of the environment at the time instant t.

Correspondingly, sets of acceptable states $H_t$ for the first vehicle, for which condition (v) above is satisfied at a given time instant t, may, as in the present embodiment, be defined as follows:

$$P_b = \{H_t \text{ in } H \text{ s.t. } a_x \leq -b_{min}\} \quad (18)$$

where $b_{min}$ is the first predetermined longitudinal deceleration.

Accordingly, the second set of conditions may allow the validity determining module 14 to determine that the planned trajectory is invalid in a case where the planned trajectory may cause the vehicle 1 to be autonomously controlled to enter the braking region without appropriately braking.

Additionally or alternatively, in example embodiments, such as the present example embodiment in which the apparatus 10 determines, for each of the plurality of time instants, a respective occupancy region, the validity determining module 14 may, as in the present example embodiment, be further configured to determine that the planned trajectory is invalid in a case where, for the first vehicle state and the second vehicle state for at least one time instant of the plurality of time instants, the following condition of a third set of conditions is satisfied:
  (i). the longitudinal position of the first model vehicle and the lateral position of the first model vehicle are within the occupancy region occupied by the second model vehicle at the time instant.

By way of specific example, the regions in which condition (vi) above is satisfied at a given time instant t may, as in the present embodiment, be defined as follows for the second model vehicle O (where the subscript i denotes that the second model vehicle O may be the $i^{th}$ model vehicle among one or more model vehicles defined in the model of the road 20 in addition to the first model vehicle):

$$R_o(H_t, E_t) = \begin{cases} (x, y) \in R^2 \text{ s.t. } x \in \left[x_i - \left(\frac{1}{2} + \frac{l_i}{2}\right), x_i + \left(\frac{1}{2} + \frac{l_i}{2}\right)\right] \text{ and} \\ y \in \left[y_i - \left(\frac{w}{2} + \frac{w_i}{2}\right), y_i + \left(\frac{w}{2} + \frac{w_i}{2}\right)\right] \text{ for some } O_{i,t} \in E_t \end{cases}, \quad (19)$$

where $H_t$ is the first vehicle state at the time instant t and $E_t$ is the state of the environment at the time instant t.

Accordingly, the third set of conditions may allow the validity determining module 14 to determine that the planned trajectory is invalid in a case where the planned trajectory may cause the vehicle 1 to collide with a vehicle modeled by the second model vehicle. As the vehicle 1 may never collide with another vehicle, the set of allowed responses to entering the occupancy region is the empty set. That is, there is no appropriate mitigating response and such trajectories may be determined as invalid.

Additionally or alternatively, the validity determining module 14 may, as in the present example embodiment, be further configured to determine that the planned trajectory is invalid in a case where the lateral position of the first model vehicle at an initial time instant among the plurality of time instants, and at a last time instant among the plurality of time instants, are located in a common lane of the plurality of lanes and, for the first vehicle state for at least one intermediate time instant of the plurality of time instants, the following condition of a fourth set of conditions is satisfied:
  (i). the lateral position of the first model vehicle is within a lane boundary region 23A, 23B, 23C, 23D extending along and comprising a lane boundary of the common lane at the at least one intermediate time instant.

By way of example, the at least one intermediate time instant may be between the initial time instant and the last time instant.

In particular, as discussed in detail above, the vehicle 1 may only be autonomously controlled to enter the lane boundary regions 23A, 23B, 23C, 23D when it is intended to switch lanes. As such, a planned trajectory that may cause the vehicle 1 to be autonomously controlled to enter a lane boundary region 23A, 23B, 23C, 23D without resulting in a lane switch may be considered unsafe because the first model vehicle may stay near the centre of a lane in which is traveling, in particular within a maximal lateral deviation $\Delta y_{bias}$ from a centre of the lane, unless the first model vehicle is switching lanes.

Accordingly, the fourth set of conditions may allow the validity determining module 14 to determine that the planned trajectory is invalid in a case where the planned trajectory may cause the vehicle 1 to enter a lane boundary region 23A, 23B, 23C, 23D in cases where the planned trajectory does not result in a lane switch.

In example embodiments such as the present example embodiment, in which the validity determining module 14 determines whether the planned trajectory is valid based on multiple sets of conditions, the validity determining module 14 may determine that a planned trajectory is invalid in accordance with one or more of the sets of conditions used. In such cases, the validity determining module 14 may, as in the present example embodiment, be configured to determine that the planned trajectory is invalid where the planned trajectory is determined to be invalid based on any of the sets of conditions.

The validity determining module 14 may as in the present example embodiment, be configured to determine, in a case where the planned trajectory is not determined to be invalid, that the planned trajectory is a valid planned trajectory.

By way of specific example, the conditions under which the validity determining module 14 determines that the planned trajectory is a valid planned trajectory may, as in the present example embodiment, be formally defined as follows:

$$\forall t \in T \forall s \in S[(x,y) \notin R_s(H_t, E_t) \text{ or } H_t \in P_s],$$

where S equals o, b, cutl, cutr, T is the plurality of time instants t, $H_t$ is the first vehicle state at time instant t, $E_t$ is the state of the environment at time instant t, and (x, y) refers to the position in the trajectory at time t.

In particular, it is apparent that, in example embodiments such as the present example embodiment, in which the validity determining module 14 determines whether the planned trajectory is valid based on multiple sets of conditions, the various regions defined by the sets of conditions may overlap such that a planned trajectory may result in the position of the first model vehicle lying in two or more regions at one or more of the plurality of time instants.

Figure 8:
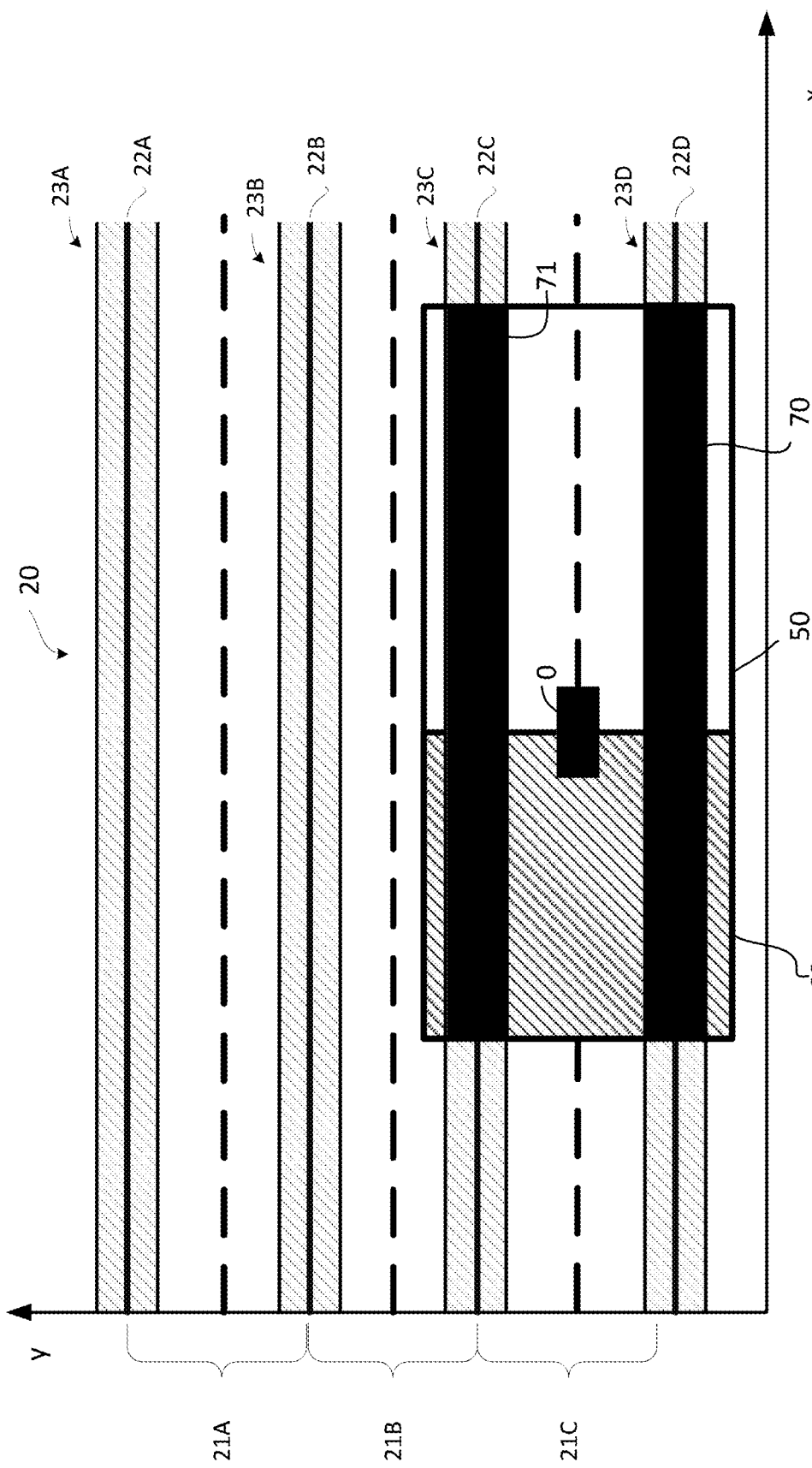
FIG. 8 is a schematic illustration showing an example of all regions defined by the process of FIG. 4, in accordance with an example embodiment herein.

FIG. 8 is a schematic illustration showing an example of all regions defined by the process of FIG. 4, in accordance with an example embodiment herein. In the Example of FIG. 8, the lateral range is depicted by region 50, the braking region is indicated by reference sign 60, the occupancy region is indicated by reference sign O, the lane boundary regions are indicated by reference signs 23A, 23B, 23C, 23D and the regions of overlap between region 50 and the lane boundary regions 23A, 23B, 23C, 23D are indicated by reference signs 70 and 71.

In some example embodiments, the process of FIG. 4 may, as in the present example embodiment, optionally include a further process step in which the validity determining module 14 outputs the valid planned trajectory to the automatic driver system 15 so as to enable the automatic driver system 15 to autonomously control the vehicle to drive along a road in accordance with the valid planned trajectory. Alternatively, the apparatus 10 may optionally include an additional module configured to output the valid planned trajectory to the automatic driver system 15.

By way of further alternative, in cases where the apparatus 10 is used, for example, to determine whether trajectories are invalid as part of simulation of autonomously controlled vehicles or as part of testing and analysis of autonomous driving algorithms, such as autonomous driving algorithms based on statistical models, the validity determining module 14 may be configured to output the valid planned trajectory to any suitable entity used in the of testing and analysis of autonomous driving algorithms, such as a connected computing device or a smart phone.

Additionally, or alternatively, in some example embodiments, the apparatus 10 may be arranged to receive multiple planned trajectories, the validity of which may be determined using the process of FIG. 4. In such example embodiments, in cases where no planned trajectory is determined to be a valid trajectory, the apparatus 10 may be further arranged to output a notification to the entity responsible for generating the planned trajectories to prompt a regeneration of a planned trajectory. Additionally, or alternatively, the apparatus 10 may be further arranged to output a notification or warning that no valid planned trajectories were determined to any suitable entity.

In the foregoing example embodiments, the first model vehicle and the second model vehicle O are each represented as an object having dynamic properties defined in the lane coordinate system. By way of alternative, the first model vehicle and the second model vehicle may be represented as one or more cells of a grid having dynamic properties defined in the lane coordinate system. By way of example, one or more cells of the grid may correspond to, for example, a bounding box or other region occupied by the second model vehicle. As such, the outermost cell or point in each direction may be considered to define the extent of the bounding box or other region occupied by the second model vehicle in that direction. the first model vehicle and any additional model vehicles may be defined in the grid in a similar manner.

Figure 9A:
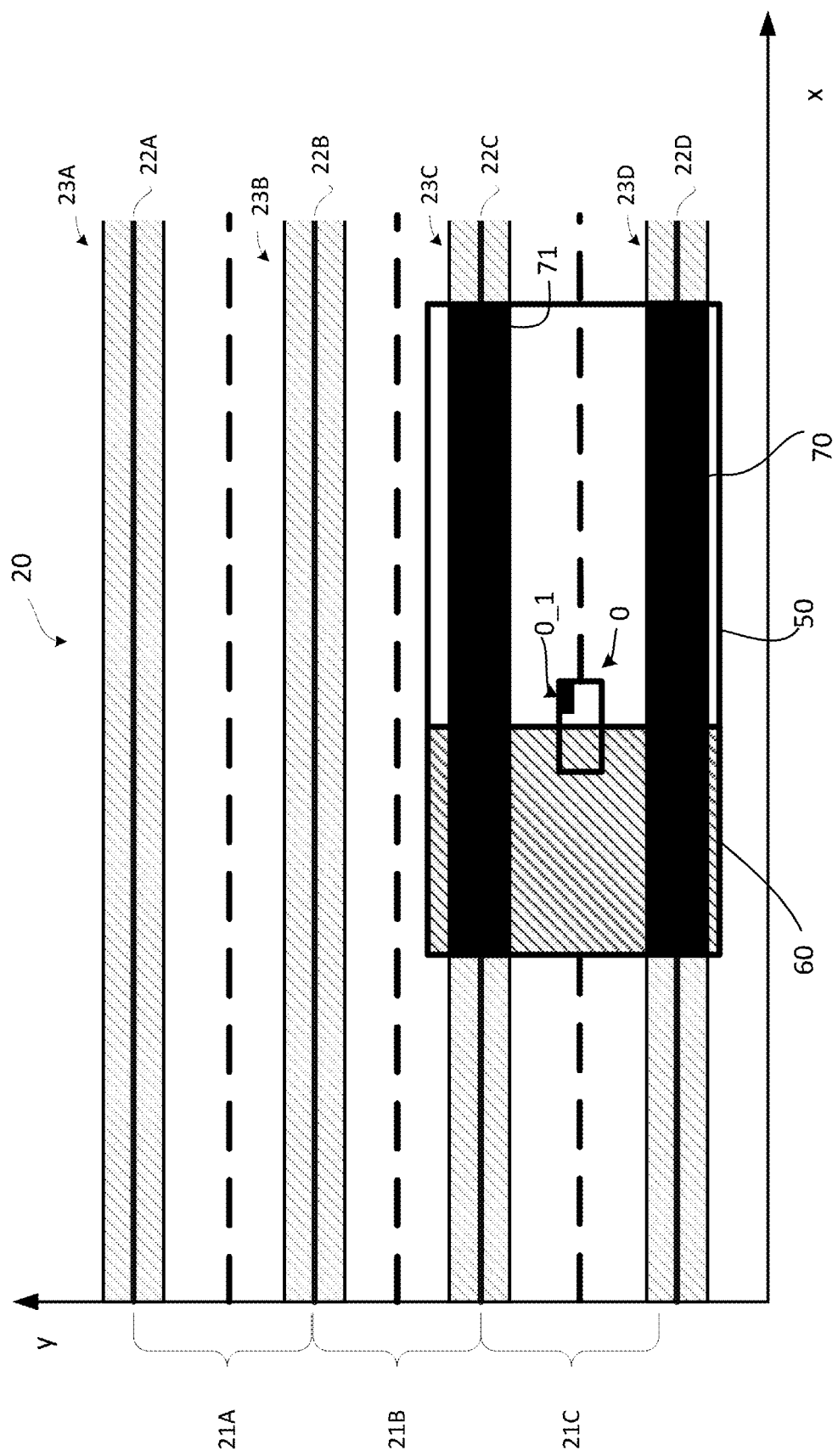
FIGS. 9A and 9B are schematic illustration showing an example of all regions defined by the process of FIG. 4 for each of a first cell $O\_1$ and a second cell $O\_n$ of a plurality of cells representing the second model vehicle O.
Figure 9B:
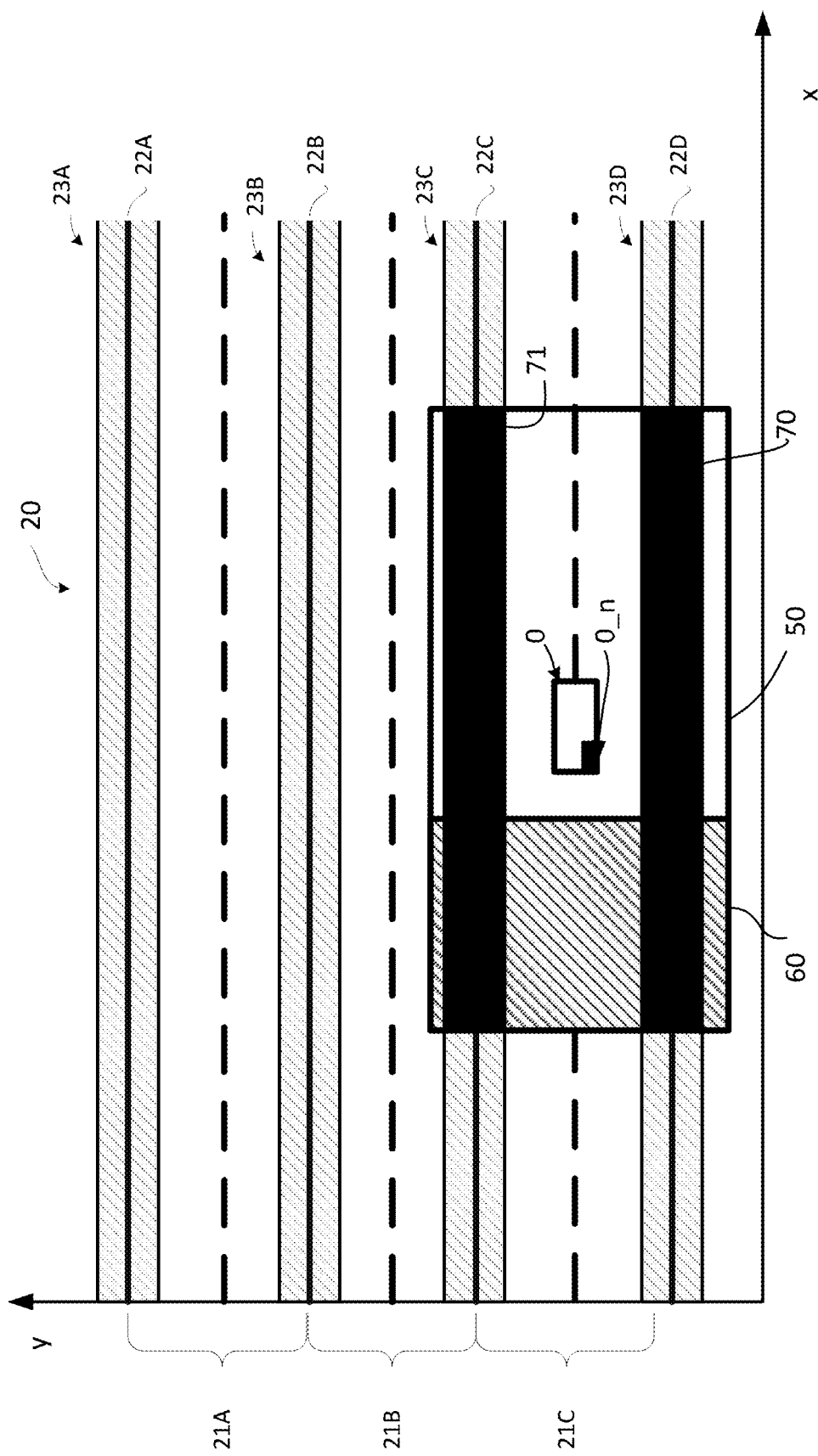

By way of example, FIGS. 9A and 9B are schematic illustration showing an example of all regions defined by the process of FIG. 4 for each of a first cell O_1 and a second cell O_n of a plurality of cells representing the second model vehicle O. In the example of FIG. 9A, the first cell O_1 is the furthest cell in the positive longitudinal direction (+x) and in the positive lateral direction (+y) of the plurality of cells representing the second model vehicle O and the second cell O_n is the furthest cell in the negative longitudinal direction (−x) and in the negative lateral direction (−y) of the plurality of cells representing the second model vehicle O.

It is noted that the determined lateral range, as well as the other ranges described above in relation to the process of FIG. 4, are defined, for example, with respect to a centre of a bounding box of the second model vehicle. Alternatively, in example embodiments in which the first model vehicle and the second model vehicle are represented as one or more cells of a grid having dynamic properties defined in the lane coordinate system, the lateral range determining unit 13 of the apparatus 10 may be configured to determine a respective lateral range for some or all of the plurality of cells representing the bounding box of the second model vehicle O for each of the plurality of time instants.

At any given time instant, the union of the respective lateral ranges of each of the cells for which a lateral range was calculated may be equivalent to the single lateral range calculated at that time instant in the case where the second model vehicle O is represented as an object having dynamic properties defined in the lane coordinate system. More particularly, the union of the respective lateral ranges of each of the cells for which a lateral range was calculated may be equivalent to the single lateral range calculated at that time instant in the case where the second model vehicle O is represented as an object having dynamic properties defined in the lane coordinate system with an error margin that is dependent on the grid resolution. Accordingly, the lateral range determining unit 13 of the apparatus 10 may be configured to determine a single lateral range for a given time instant as the union of the respective lateral ranges of each of the cells for which a lateral range was calculated for that time instant.

By way of example, in example embodiments such as the present example embodiment, in which the lateral range determining unit 13 determines the lateral range using function (8) above, it is noted that function (8) is monotonically increasing with the lateral position $y_i$ of the second model vehicle O for all values of the lateral velocity $v_{y,i}$ of the second model vehicle O. As such, the lateral ranges determined for the intermediate cells of the plurality of cells representing the second model vehicle O will not extend further than the lateral ranges determined for the outermost cells. Therefore, the union of the lateral ranges the outermost cell points of a given object will be equivalent to the single lateral range determined at that time instant in the case where the second model vehicle O is represented as an object having dynamic properties defined in the lane coordinate system.

For example, as shown in FIGS. 9A and 9B, the union of the lateral ranges (as well as the other ranges and regions) determined for each of cells O_1 and O_n are equivalent to the single lateral range (as well as the other ranges and regions) shown in FIG. 8 determined in a case where the second model vehicle O is represented as an object having dynamic properties defined in the lane coordinate system.

The model of the road 20, in which the environment of the first model vehicle, specifically the first model vehicle and any additional model vehicles, are represented as one or more cells of a grid having dynamic properties defined in a suitable coordinate system, may be obtained by any suitable way known to those versed in the art. By way of example, each of the following papers define techniques by which an environment of a vehicle may be represented as a grid defined in a suitable coordinate system having occupied cells having dynamic properties:

Dominik Nuss et al.: "*A Random Finite Set Approach for Dynamic Occupancy Grid Maps with Real-Time Application*", (arXiv:1605.02406v2);

S. Steyer, et al.: "*Grid-Based Environment Estimation Using Evidential Mapping and Particle Tracking*," in IEEE Transactions on Intelligent Vehicles, vol. 3, no. 3, pp. 384-396, September 2018, doi: 10.1109/TIV.2018.2843130;

Stefan Hoermann et al.: "*Dynamic Occupancy Grid Prediction for Urban Autonomous Driving: A Deep Learning Approach with Fully Automatic Labeling*", (arXiv:1705.08781v2); and Christopher Diehl et al.: "*Radar-based Dynamic Occupancy Grid Mapping and Object Detection*", (arXiv:2008.03696v1).

The example aspects described here avoid limitations, specifically rooted in computer technology, relating to the field of autonomous driving. By virtue of the example aspects described herein, it can be avoided that planned trajectories that represent a best response to unsafe driving of another road user are determined invalid, while ensuring that planned trajectories that may cause a vehicle to be autonomously controlled to drive unsafely may be invalidated. Furthermore, by obtaining a first vehicle state and a second vehicle state for each of the plurality of time instants and determining whether the planned trajectory is invalid when at least the first set of conditions are satisfied for even one time instant of the plurality of time instants, the techniques herein may allow the safety of the entire planned trajectory to be analysed. In some example embodiments, such as the present example embodiment, in which the apparatus 10 determines, for each of the plurality of time instants, a respective first longitudinal range extending from and ahead of the second model vehicle O and a respective second longitudinal range extending from and behind the second model vehicle O, the first set of conditions may, as in the present example embodiment, further comprise a condition that the longitudinal position of the first model vehicle is in the first longitudinal range or the second longitudinal range at the time instant. Also, by virtue of the foregoing capabilities of the example aspects described herein, which are rooted in computer technology, the example aspects described herein improve computers and computer processing/functionality, and also improve the field(s) of at least of autonomous driving and, in particular, determination of whether a planned trajectory of a first model vehicle, for use in autonomous control of a vehicle modeled by the first model vehicle, is invalid.

In the foregoing description, aspects are described with reference to several embodiments. Accordingly, the specification should be regarded as illustrative, rather than restrictive. Similarly, the figures illustrated in the drawings, which highlight the functionality and advantages of the embodiments, are presented for example purposes only. The architecture of the embodiments is sufficiently flexible and configurable, such that it may be utilized in ways other than those shown in the accompanying figures.

Software embodiments presented herein may be provided as a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nano systems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the embodiments described herein. Such software may include without limitation device drivers, operating systems, and user applications. Ultimately, such computer-readable media or storage device(s) further include software for performing example aspects, as described above.

Included in the programming and/or software of the system are software modules for implementing the procedures described herein. In some example embodiments herein, a module includes software, although in other example embodiments herein, a module includes hardware, or a combination of hardware and software.

While various embodiments of the present disclosure have been described above, it should be understood that they have been presented by way of example, and not limitation. It will be apparent to persons skilled in the relevant art(s) that various changes in form and detail can be made therein. Thus, the present disclosure should not be limited by any of the above described example embodiments but should be defined only in accordance with the following claims and their equivalents.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the embodiments presented herein in any way. It is also to be understood that any procedures recited in the claims need not be performed in the order presented.

While this specification contains many specific embodiment details, these should not be construed as limitations on what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having described some illustrative embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements, and features discussed only in connection with one embodiment are not intended to be excluded from a similar role in other embodiments or embodiments.

The apparatuses described herein may be embodied in other specific forms without departing from the characteristics thereof. The foregoing embodiments are illustrative rather than limiting of the described systems and methods. Scope of the apparatuses described herein is thus indicated by the appended claims, rather than the foregoing description, and changes that come within the meaning and range of equivalence of the claims are embraced therein.

What is claimed is:

1. A method of determining whether a planned trajectory of a first model vehicle is invalid, the method comprising:
    obtaining the planned trajectory, the planned trajectory:
        corresponding to a model of a road along which the first model vehicle and a second model vehicle are traveling, the model of the road comprising a plurality of lanes defined by a plurality of lane boundaries,
        usable for autonomous control of a vehicle modelled as the first model vehicle, and
        comprising, for each of a plurality of time instants, a first vehicle state of the first model vehicle defined relative to the model of the road at the respective time instant, the first vehicle state comprising:
            a lateral position of the first model vehicle, a lateral velocity of the first model vehicle, and a lateral acceleration of the first model vehicle at the respective time instant;
    obtaining, for each of the plurality of time instants, a second vehicle state of the second model vehicle defined relative to the model of the road at the respective time instant, the second vehicle state comprising a lateral position of the second model vehicle in the model of the road at the respective time instant;
    determining, for each of the plurality of time instants, a lateral range extending from the second model vehicle at the respective time instant, the lateral range based on the lateral position of the second model vehicle relative to a center of a lane of the plurality of lanes in which the second model vehicle is located at the respective time instant;
    determining that the planned trajectory is invalid responsive to determining, for at least one of the time instants, that:
        the lateral position of the first model vehicle is within the lateral range of the second model vehicle and within a lane boundary region that extends along and comprises one of the lane boundaries, and
        the lateral velocity of the first model vehicle is towards the second model vehicle, and the lateral acceleration of the first model vehicle is away from the second model vehicle and a magnitude of the lateral acceleration of the first model vehicle away from the second model vehicle is less than a magnitude of a predetermined lateral deceleration of the first model vehicle; and
    responsive to determining that the planned trajectory is valid for each of the time instants, controlling operation of the first model vehicle along the planned trajectory; or
    responsive to determining that the planned trajectory is invalid for at least one of the time instants, causing another planned trajectory of the first model vehicle to be generated.

2. The method according to claim 1, wherein:
    the second vehicle state further comprises a lateral velocity of the second model vehicle; and
    the lateral range is based on the lateral velocity of the second model vehicle.

3. The method according to claim 1, wherein:
    the first vehicle state further comprises a longitudinal position of the first model vehicle and a longitudinal velocity of the first model vehicle;
    the second vehicle state further comprises a longitudinal velocity of the second model vehicle and a longitudinal acceleration of the second model vehicle; and
    the method further comprises:
        determining, for each of the plurality of time instants, a first longitudinal range at the respective time instant, the first longitudinal range extending from and ahead of the second model vehicle and being based on:
            the longitudinal velocity of the first model vehicle,
            the longitudinal velocity of the second model vehicle,
            the longitudinal acceleration of the second model vehicle,
        a predefined reaction time of the second model vehicle, a first predetermined longitudinal deceleration of the second model vehicle, and a first predetermined longitudinal deceleration of the first model vehicle at the respective time instant; and
        determining, for each of the plurality of time instants, a second longitudinal range at the respective time instant, the second longitudinal range extending from and behind the second model vehicle and being based on:
            the longitudinal velocity of the first model vehicle,
            the longitudinal velocity of the second model vehicle,
        a predefined reaction time of the first model vehicle, a second predetermined longitudinal deceleration of the first model vehicle, and a second predetermined longitudinal deceleration of the second model vehicle at the respective time instant.

4. The method according to claim 3, wherein the determining that the planned trajectory is invalid is further responsive to determining that the longitudinal position of the first model vehicle is in the first longitudinal range or the second longitudinal range for at least one of the time instants.

5. The method according to claim 3, further comprising:
    determining, for each of the plurality of time instants, a second lateral range at the respective time instant, the second lateral range extending from the second model vehicle, wherein the second lateral range and the second longitudinal range define a braking region of the model of the road extending in a first lateral direction and in a second lateral direction from a lateral center of the first model vehicle; and determining that the planned trajectory is invalid responsive to determining, for at least one of the time instants that:
the longitudinal position of the first model vehicle is within the second longitudinal range,
the lateral position of the first model vehicle is within the second lateral range, and
the longitudinal acceleration of the first model vehicle is away from the second model vehicle and is less than the first predetermined longitudinal deceleration of the first model vehicle.

6. The method according to claim 1, wherein:
the first vehicle state further comprises a longitudinal position of the first model vehicle;
the second vehicle state further comprises a length of the second model vehicle and a width of the second model vehicle; and
the method further comprises:
determining, for each of the plurality of time instants, an occupancy region that is occupied by the second model vehicle, the occupancy region being based on the length of the second model vehicle and the width of the second model vehicle at the respective time instant; and
determining that the planned trajectory is invalid responsive to determining, for at least one of the time instants that the longitudinal position of the first model vehicle and the lateral position of the first model vehicle are within the occupancy region occupied by the second model vehicle.

7. The method according to claim 1, wherein the second model vehicle comprises:
a location of the second model vehicle in a lane coordinate system of the model of the road, a length of the second model vehicle along a longitudinal axis of the lane coordinate system, and a width of the second model vehicle along a lateral axis of the lane coordinate system; or
one or more cells of a grid defined in the lane coordinate system.

8. The method according to claim 1, further comprising:
determining that the planned trajectory is invalid responsive to determining:
for an initial time instant and a last time instant of the time instants, that the lateral position of the first model vehicle is within a common lane of the plurality of lanes; and
for an intermediate time instant of the time instants, that the lateral position of the first model vehicle is within a lane boundary region extending along and comprising a lane boundary of the common lane.

9. The method according to claim 1, wherein a time interval between each successive pair of the time instants is less than or equal to a predefined reaction time of the first model vehicle.

10. The method according to claim 1, further comprising:
determining that the planned trajectory is valid responsive to not determining that: the lateral position of the first model vehicle is within the lateral range of the second model vehicle and within the lane boundary region that extends along and comprises one of the lane boundaries, that the lateral velocity of the first model vehicle is towards the second model vehicle, and that the lateral acceleration of the first model vehicle is away from the second model vehicle and is less than the predetermined lateral deceleration of the first model vehicle; and
outputting the planned trajectory to an automatic driver system effective to enable the automatic driver system to autonomously control the vehicle to drive along the road in accordance with the planned trajectory.

11. A non-transitory computer-readable storage medium comprising instructions that, when executed by a computer processor, cause the computer processor to:
obtain a planned trajectory, the planned trajectory:
corresponding to a model of a road along which a first model vehicle and a second model vehicle are traveling, the model of the road comprising a plurality of lanes defined by a plurality of lane boundaries,
usable for autonomous control of a vehicle modelled as the first model vehicle, and
comprising, for each of a plurality of time instants, a first vehicle state of the first model vehicle defined relative to the model of the road at the respective time instant, the first vehicle state comprising:
a lateral position of the first model vehicle,
a lateral velocity of the first model vehicle, and
a lateral acceleration of the first model vehicle at the respective time instant;
obtain, for each of the plurality of time instants, a second vehicle state of the second model vehicle defined relative to the model of the road at the respective time instant, the second vehicle state comprising a lateral position of the second model vehicle in the model of the road at the respective time instant;
determine, for each of the plurality of time instants, a lateral range extending from the second model vehicle at the respective time instant, the lateral range based on the lateral position of the second model vehicle relative to a center of a lane of the plurality of lanes in which the second model vehicle is located at the respective time instant;
determine that the planned trajectory is invalid responsive to determining, for at least one of the time instants, that:
the lateral position of the first model vehicle is within the lateral range of the second model vehicle and within a lane boundary region that extends along and comprises one of the lane boundaries, and
the lateral velocity of the first model vehicle is towards the second model vehicle, and
the lateral acceleration of the first model vehicle is away from the second model vehicle and a magnitude of the lateral acceleration of the first model vehicle away from the second model vehicle is less than a magnitude of a predetermined lateral deceleration of the first model vehicle; and
responsive to a determination that the planned trajectory is valid for each of the time instants, control operation of the first model vehicle along the planned trajectory; or
responsive to a determination that the planned trajectory is invalid for at least one of the time instants, cause another planned trajectory of the first model vehicle to be generated.

12. An apparatus comprising a computer processor configured to:
obtain a planned trajectory, the planned trajectory:
corresponding to a model of a road along which a first model vehicle and a second model vehicle are traveling, the model of the road comprising a plurality of lanes defined by a plurality of lane boundaries, usable for autonomous control of a vehicle modelled as the first model vehicle, and comprising, for each of a plurality of time instants, a first vehicle state of the first model vehicle defined relative to the model of the road at the respective time instant, the first vehicle state comprising:
 a lateral position of the first model vehicle, a lateral velocity of the first model vehicle, and a lateral acceleration of the first model vehicle at the respective time instant;

obtain, for each of the plurality of time instants, a second vehicle state of the second model vehicle defined relative to the model of the road at the respective time instant, the second vehicle state comprising a lateral position of the second model vehicle in the model of the road at the respective time instant;

determine, for each of the plurality of time instants, a lateral range extending from the second model vehicle at the respective time instant, the lateral range based on the lateral position of the second model vehicle relative to a center of a lane of the plurality of lanes in which the second model vehicle is located at the respective time instant;

determine that the planned trajectory is invalid responsive to determining, for at least one of the time instants, that:
 the lateral position of the first model vehicle is within the lateral range of the second model vehicle and within a lane boundary region that extends along and comprises one of the lane boundaries,
 the lateral velocity of the first model vehicle is towards the second model vehicle, and
 the lateral acceleration of the first model vehicle is away from the second model vehicle and a magnitude of the lateral acceleration of the first model vehicle away from the second model vehicle is less than a magnitude of a predetermined lateral deceleration of the first model vehicle; and responsive to a determination that the planned trajectory is valid for each of the time instants, control operation of the first model vehicle along the planned trajectory; or responsive to a determination that the planned trajectory is invalid for at least one of the time instants, cause another planned trajectory of the first model vehicle to be generated.

13. The apparatus of claim 12, wherein:
the second vehicle state further comprises a lateral velocity of the second model vehicle; and
the lateral range is based on the lateral velocity of the second model vehicle.

14. The apparatus of claim 12, wherein:
the first vehicle state further comprises a longitudinal position of the first model vehicle and a longitudinal velocity of the first model vehicle;
the second vehicle state further comprises a longitudinal velocity of the second model vehicle and a longitudinal acceleration of the second model vehicle; and
the processor is further configured to:
 determine, for each of the plurality of time instants, a first longitudinal range at the respective time instant, the first longitudinal range extending from and ahead of the second model vehicle and being based on:
  the longitudinal velocity of the first model vehicle,
  the longitudinal velocity of the second model vehicle,
  the longitudinal acceleration of the second model vehicle,
  a predefined reaction time of the second model vehicle,
  a first predetermined longitudinal deceleration of the second model vehicle, and
  a first predetermined longitudinal deceleration of the first model vehicle at the respective time instant;
 determine, for each of the plurality of time instants, a second longitudinal range at the respective time instant, the second longitudinal range extending from and behind the second model vehicle and being based on:
  the longitudinal velocity of the first model vehicle,
  the longitudinal velocity of the second model vehicle,
  a predefined reaction time of the first model vehicle,
  a second predetermined longitudinal deceleration of the first model vehicle, and
  a second predetermined longitudinal deceleration of the second model vehicle at the respective time instant; and
 determine that the planned trajectory is invalid responsive to determining that the longitudinal position of the first model vehicle is in the first longitudinal range or the second longitudinal range for at least one of the time instants.

15. The apparatus of claim 14, wherein the processor is further configured to:
determine, for each of the plurality of time instants, a second lateral range at the respective time instant, the second lateral range extending from the second model vehicle, wherein the second lateral range and the second longitudinal range define a braking region of the model of the road extending in a first lateral direction and in a second lateral direction from a lateral center of the first model vehicle; and
determine that the planned trajectory is invalid responsive to determining, for at least one of the time instants that:
 the longitudinal position of the first model vehicle is within the second longitudinal range,
 the lateral position of the first model vehicle is within the second lateral range, and
 the longitudinal acceleration of the first model vehicle is away from the second model vehicle and is less than the first predetermined longitudinal deceleration of the first model vehicle.

16. The apparatus of claim 12, wherein:
the first vehicle state further comprises a longitudinal position of the first model vehicle;
the second vehicle state further comprises a length of the second model vehicle and a width of the second model vehicle; and
the processor is further configured to:
 determine, for each of the plurality of time instants, an occupancy region that is occupied by the second model vehicle, the occupancy region being based on the length of the second model vehicle and the width of the second model vehicle at the respective time instant; and
 determine that the planned trajectory is invalid responsive to determining, for at least one of the time instants that the longitudinal position of the first model vehicle and the lateral position of the first model vehicle are within the occupancy region occupied by the second model vehicle.

17. The apparatus of claim 12, wherein the second model vehicle comprises:

a location of the second model vehicle in a lane coordinate system of the model of the road, a length of the second model vehicle along a longitudinal axis of the lane coordinate system, and a width of the second model vehicle along a lateral axis of the lane coordinate system; or one or more cells of a grid defined in the lane coordinate system.

18. The apparatus of claim 12, wherein the processor is further configured to:

determine that the planned trajectory is invalid responsive to determining:

for an initial time instant and a last time instant of the time instants, that the lateral position of the first model vehicle is within a common lane of the plurality of lanes; and for an intermediate time instant of the time instants, that the lateral position of the first model vehicle is within a lane boundary region extending along and comprising a lane boundary of the common lane.

19. The apparatus of claim 12, wherein a time interval between each successive pair of the time instants is less than or equal to a predefined reaction time of the first model vehicle.

20. The apparatus of claim 12, wherein the processor is further configured to:

determine that the planned trajectory is valid responsive to not determining that:

the lateral position of the first model vehicle is within the lateral range of the second model vehicle and within the lane boundary region that extends along and comprises one of the lane boundaries, that the lateral velocity of the first model vehicle is towards the second model vehicle, and that the lateral acceleration of the first model vehicle is away from the second model vehicle and is less than the predetermined lateral deceleration of the first model vehicle; and output the planned trajectory to an automatic driver system effective to enable the automatic driver system to autonomously control the vehicle to drive along the road in accordance with the planned trajectory.

* * * * *